(12) United States Patent
Matsumoto et al.

(10) Patent No.: US 7,879,923 B2
(45) Date of Patent: Feb. 1, 2011

(54) METHOD FOR SURFACE-TREATMENT OF WATER ABSORBENT RESIN

(75) Inventors: Makoto Matsumoto, Himeji (JP);
Yoshiro Mitsukami, Himeji (JP);
Hiroyuki Ikeuchi, Himeji (JP); Kazushi Torii, Himeji (JP); Taku Iwamura, Himeji (JP)

(73) Assignee: Nippon Shokubai Co., Ltd., Osaka (JP)

( * ) Notice: Subject to any disclaimer, the term of this patent is extended or adjusted under 35 U.S.C. 154(b) by 319 days.

(21) Appl. No.: 11/721,293

(22) PCT Filed: Dec. 9, 2005

(86) PCT No.: PCT/JP2005/023089

§ 371 (c)(1),
(2), (4) Date: Jun. 8, 2007

(87) PCT Pub. No.: WO2006/062253

PCT Pub. Date: Jun. 15, 2006

(65) Prior Publication Data
US 2009/0239966 A1    Sep. 24, 2009

(30) Foreign Application Priority Data

Dec. 10, 2004  (JP) .............................. 2004-359033
Aug. 22, 2005  (JP) .............................. 2005-240214

(51) Int. Cl.
*C08J 7/16* (2006.01)
*C08J 7/18* (2006.01)
*A61L 15/60* (2006.01)
*C08L 33/02* (2006.01)

(52) U.S. Cl. .............................. 522/59; 522/60; 522/62; 522/49; 522/85; 524/832

(58) Field of Classification Search .................. 522/60, 522/62, 49, 59, 84–86, 832
See application file for complete search history.

(56) References Cited

U.S. PATENT DOCUMENTS

| 4,666,983 | A | 5/1987 | Tsubakimoto et al. |
| 4,783,510 | A | 11/1988 | Saotome |
| 4,910,250 | A | 3/1990 | Saotome |
| 5,422,405 | A | 6/1995 | Dairoku et al. |
| 6,417,425 | B1 * | 7/2002 | Whitmore et al. ............. 604/367 |
| 7,201,941 | B2 * | 4/2007 | Irie et al. ..................... 427/222 |
| 7,511,083 | B2 * | 3/2009 | Madsen et al. ................ 522/24 |
| 2004/0143030 | A1 | 7/2004 | Ikkai |
| 2006/0052478 | A1 | 3/2006 | Madsen et al. |

FOREIGN PATENT DOCUMENTS

| DE | 19619680 | 11/1997 |
| EP | 0248437 | 12/1987 |
| EP | 1 400 538 | 3/2004 |
| EP | 1 838 766 | 12/2008 |
| JP | 63-099211 | 4/1988 |
| JP | 01-126314 | 5/1989 |
| JP | A03000767 | 1/1991 |
| JP | 2530668 | 6/1996 |
| JP | A-1-126314 | 6/1996 |
| JP | B2530668 | 6/1996 |
| JP | 10-316764 | 2/1998 |
| JP | A2004-99789 | 4/2004 |
| JP | 2005-097585 | 4/2005 |
| JP | 2005-200630 | 7/2005 |
| JP | A-2005-200630 | 7/2005 |
| JP | 2005-213523 | 8/2005 |
| JP | 2007-119757 | 5/2007 |
| WO | WO2004/031253 | 4/2004 |
| WO | WO2006/007997 | 1/2006 |
| WO | WO 2006/062253 | 6/2006 |

OTHER PUBLICATIONS

Burr, "Graft Copolymers of Starch and Mixtures of Acrylamide and Acrylic Acid." Journal of Applied Polymer Science, 20:3201-3204 (1976).
Chawla et al., "Electron Spin Resonance and Pulse Radiolysis Studies of Some Reactions of $SO_4$," The Journal of Physical Chemistry, vol. 79, No. 24, 2693-2700 (1975).
Tang et al., "Kinetics and Spectroscopy of the $SO_4$—Radical in Aqueous Solution," Journal of Photochemistry and Photobiology, 44, 243-258 (1988).
Chawla et al. "Electron Spin Resonance and Pulse Radiolysis Studies of Some Reactions of $SO_4$." The Journal of Physical Chemistry, vol. 79, No. 24, 1975; pp. 2693-2700.
Tang et al. "Kinetics and Spectroscopy of the $SO_4$ Radical in Aqueous Solution". Journal of Photochemistry and Photobiology, A: Chemistry, 44 (1988); pp. 243-258.

* cited by examiner

*Primary Examiner*—Susan W Berman
(74) *Attorney, Agent, or Firm*—Occhiuti Rohlicek & Tsao LLP

(57) ABSTRACT

This invention is to provide a method for surface-treatment of a water absorbent resin excelling in water absorption properties. This invention relates to a method for the surface-treatment of a water absorbent resin, which comprises: a) mixing 100 parts by weight of a water absorbent resin, 0.01-20 parts by weight of at least one radical polymerization initiator selected from the group consisting of persulfates, hydrogen peroxide, and azo compounds, and a radically polymerizing compound and b) irradiating the resultant mixture with active energy rays. The treatment particularly exalts the absorption ratio against pressure and the saline flow conductivity.

25 Claims, 1 Drawing Sheet

METHOD FOR SURFACE-TREATMENT OF WATER ABSORBENT RESIN

CROSS-REFERENCE TO RELATED APPLICATIONS

This application is being filed as a U.S. National Stage under 35 U.S.C. 371 of International Application No. PCT/JP2005/023089, filed Dec. 9, 2005, which claims the benefit of Japanese Application Serial No. 2005-240214, filed Aug. 22, 2005 and Japanese Application Serial No. 2004-359033, filed Dec. 10, 2004. The contents of the prior applications are hereby incorporated by reference in their entirety.

TECHNICAL FIELD

This invention relates to a method for the surface-treatment of a water absorbent resin and more particularly to a method for the surface-treatment of a water absorbent resin which comprises mixing a water absorbent resin with a radically polymerizing compound and a specific radical polymerization initiator and then irradiating the water absorbent resin with active energy rays.

BACKGROUND ART

The water absorbent resin has been hitherto used as one component for hygienic materials such as sanitary cotton, disposable diaper, and absorbents for other kinds of body fluid. As concrete examples of the water absorbent resin, hydrolyzate of starch-acrylonitrile graft polymer, neutralized starch-acrylic acid graft polymer, saponified vinyl acetate-acrylic acid ester copolymer, hydrolyzate of acrylonitrile copolymer or acrylamide copolymer, and the product of crosslinkage thereof, and partially neutralized crosslinked acrylic acid may be cited. These water absorbent resins invariably possess an internal crosslinked structure and exhibit no solubility in water.

The characteristic properties which these water absorbent resins are expected to possess include high absorption capacity, perfect absorption speed, high gel strength, and fully satisfactory suction force necessary for sucking water from a medium, for example. Since the water absorbing properties are affected by crosslink density, they do not necessarily manifest positive correlations with one another as evinced by the fact that an increase in the crosslink density leads to an increase in the gel strength but a decrease in the amount of water absorbed. Particularly, the absorption capacity is in a contradictory relation with the absorption speed, the gel strength, and the suction force, for example. The water absorbent resin which has acquired an enhanced absorption capacity, therefore, possibly shuns uniform absorption of water and forms portions of partial aggregation of itself when the water absorbent resin particles contact with water and induces extreme deterioration of the absorption speed because the water is not diffused throughout the entire volumes of water absorbent resin particles.

For the purpose of relaxing this phenomenon and obtaining a water absorbent resin which has a high absorption capacity and a comparatively satisfactory absorption speed, a method for giving the water absorbent resin particles a surface coated with a surfactant or a nonvolatile hydrocarbon has been available. This method indeed exalts the dispersibility of the initially absorbed water but brings no sufficient effects in enhancing the absorption speed and the suction force of the individual resin particles.

As a means to produce a polyacrylic acid type polymer of high water absorbing property, a method which comprises causing an aqueous composition having a partial alkali metal salt of polyacrylic acid as a main component and having a low crosslink density to be heated in the presence of a water-soluble peroxide radical initiating agent thereby introducing a crosslink therein by radical crosslinkage has been proposed (U.S. Pat. No. 4,910,250). It is difficult to distribute uniformly internal crosslinks in the polymer and uneasy to adjust the crosslink density. Thus, a measure of preparing a polymer which contains water-soluble polyacrylic acid gel having low crosslink density and then heating the polymer together with a persulfate added thereto as a polymerization initiator is adopted. U.S. Pat. No. 4,910,250 claims to realize precise control of crosslink density by adjusting the amount of the initiating agent to be added and, owing to the uniform presence of crosslink in the polymer, acquire perfect water absorbing properties and obtain as well a water absorbent resin devoid of stickiness.

While the persulfate which is used in U.S. Pat. No. 4,910,250 mentioned above is decomposed by heat, it is decomposed by ultraviolet rays and generates radicals (J. Phys. Chem., 1975, 79, 2693, J. Photochem. Photobiol., A. 1988, 44, 243). Since the persulfate fulfills a function as a polymerization initiator, the irradiation of the aqueous solution of a water soluble vinyl monomer with a light energy induces the initiator to dissociate and form a radical and enables the resultant monomer radical to attack the next monomer and produce a synthetic polymer gel (JP-A 2004-99789). The method of JP-A 2004-99789 is supposed by irradiating an aqueous solution containing a water-soluble vinyl monomer of a specific structure and a persulfate with ultraviolet rays to effect the polymerization of the water-soluble vinyl monomer and the cross-linkage of the formed polymer simultaneously. Incidentally, a reaction system which forms an internal crosslink by adding a hydrophilic polymer component, a photo-polymerization initiator, and a crosslinking agent together and irradiating them with ultraviolet rays has been known (WO 2004/031253). By the method in WO 2004/031253, a cross-linked hydrogel is obtained by using a persulfate as a photopolymerization initiator and irradiating the aqueous solution of a water-soluble polymer with ultraviolet rays in the presence of a cross-linking agent.

Meanwhile, a method which gives a water absorbent resin a surface treatment with a crosslinking agent and imparts thereto a surface of a heightened crosslink density has been also known (U.S. Pat. No. 4,666,983 and U.S. Pat. No. 5,422,405, for example). The water absorbent resin, as described above, is a water-insoluble polymer having an internal crosslink which is produced by incorporating an inner crosslinking agent and a polymerization initiator in a polymerizing monomer and polymerizing the monomer. On the surface of the water absorbent resin resulting from the polymerization, the reactive functional groups contained in the monomer are present. By introducing cross-linkage between the functional groups by adding a surface crosslinking gent capable of reacting with such functional groups, therefore, the resultant water absorbent resin has improved crosslink density and can manifest excellent water absorption properties even under pressure.

Since the use of the surface crosslinking agent mentioned above requires the reaction for the formation of crosslinks to be performed at a high temperature for a long time and entails the problem of suffering persistence of the crosslinking agent in the unaltered state, a method which, by causing an aqueous solution containing a peroxide radical initiating agent to contact with a resin and heating the resin, accomplishes introduction of crosslinks into polymer molecular chains in the neighborhood of the surface of the resin by virtue of decomposition of the radical initiating agent has been proposed (U.S. Pat. No. 4,783,510). In a working example of this method, a water absorbent resin exhibiting an exalted absorption capacity was obtained by effecting the heating with superheated steam at 130° C. for 6 minutes. Further, a water absorbent resin manifesting an exalted water absorption capacity was obtained by incorporating further such a hydrophilic polyfunctional unsaturated compound as N,N'-methylenebisacrylamide in an aqueous solution containing a peroxide radical initiator, allowing the aqueous solution to contact with a resin, and thereafter heating it.

A method which comprising impregnating a water absorbent resin with a water-soluble ethylenically unsaturated monomer, polymerizing the resin, and heating the resultant polymer, to produce a water absorbent resin of enhanced quality possessing a higher cross-link density in the neighborhood of the surface of resin particles than in the interior of the resin particles has been also known (Japanese Patent No. 2530668). This water absorbent resin has a higher cross-link density in the neighborhood of the surface than in the interior of the resin particles, because the aqueous solution containing the water-soluble ethylenically unsaturated monomer, during the surface cross-linkage of the water absorbent resin, is caused to contain a crosslinking agent of a higher concentration than the crosslinking agent used during the polymerization of the water absorbent resin and the polymer layer is formed on the surface of the water absorbent resin by using this solution. Japanese Patent No. 2530668 has stated that such a water-soluble radically polymerization initiator as potassium persulfate and sodium persulfate can be used as the polymerization initiator during surface crosslinkage. In one working example cited therein, the polymerization was initiated by heating this initiator to a temperature of 60° C.

DISCLOSURE OF INVENTION

The object of introducing surface crosslinks into a water absorbent resin is directed toward a method for producing a water absorbent resin which possesses a perfect balance between the absorption capacity and the absorption speed. Generally, this object requires a crosslinking agent possessing at least two functional groups capable of reacting with the functional group present in the surface of the water absorbent resin to act on the water absorbent resin. As concrete examples of the crosslinking agent of this quality, polyhydric alcohols, polyvalent glycidyl ethers, haloepoxy compounds, polyvalent aldehydes, polyvalent amines, and polyvalent metal salts may be cited. Since the crosslinking agent has low reactivity, the relevant reaction is required to be carried out at an elevated temperature and occasionally to be retained in a heated state for a long time. The reaction, therefore, demands copious amounts of energy and time.

The method of surface treatment of U.S. Pat. No. 4,783,510 which uses a peroxide radical initiating agent as a crosslinking agent necessitates for efficient advance of the reaction a high reaction temperature and humidification serving the purpose of retaining the water necessary for the advance of the reaction. It, therefore, stands in need of further exaltation of the efficiency of production.

In such an existing state of affairs as this, this invention is aimed at providing a method for the production of a water absorbent resin which is so modified as to excel in the efficiency of production and in such properties as absorbency against pressure, absorption speed, gel strength, and permeability of liquid.

A detailed study made of the method for surface-treating a water absorbent resin reveals that by mixing a water absorbent resin with a persulfate which has heretofore been used as a polymerization initiator and a radical polymerizing compound and subsequently irradiating the resultant mixture with active energy rays, a surface-crosslinked water absorbent resin excelling in water absorbing properties can be obtained. This invention has been perfected as a result.

Heretofore, the surface crosslinkage has required a treatment at a high temperature in the range of 100-300° C., depending on the kind of a surface crosslinking agent to be incorporated in the relevant composition. This invention is capable of effecting introduction of a surface crosslink simply by irradiation with active energy rays without requiring use of a surface crosslinking agent. Consequently, the surface-treated water absorbent resin according to this invention veritably excels in such characteristic properties as absorption capacity, absorption speed, gel strength, and suction force which the water absorbent resin is expected to possess.

The method of this invention effects the surface crosslinkage by irradiation with the active energy rays. It is, therefore, capable of surface-treating the water absorbent resin in a brief space of time as compared with the conventional method.

The above and other objects, features and advantages of the present invention will become clear from the following description of the preferred embodiments and illustrated in the attached drawings.

BEST MODE FOR CARRYING OUT THE INVENTION

Figure 1:
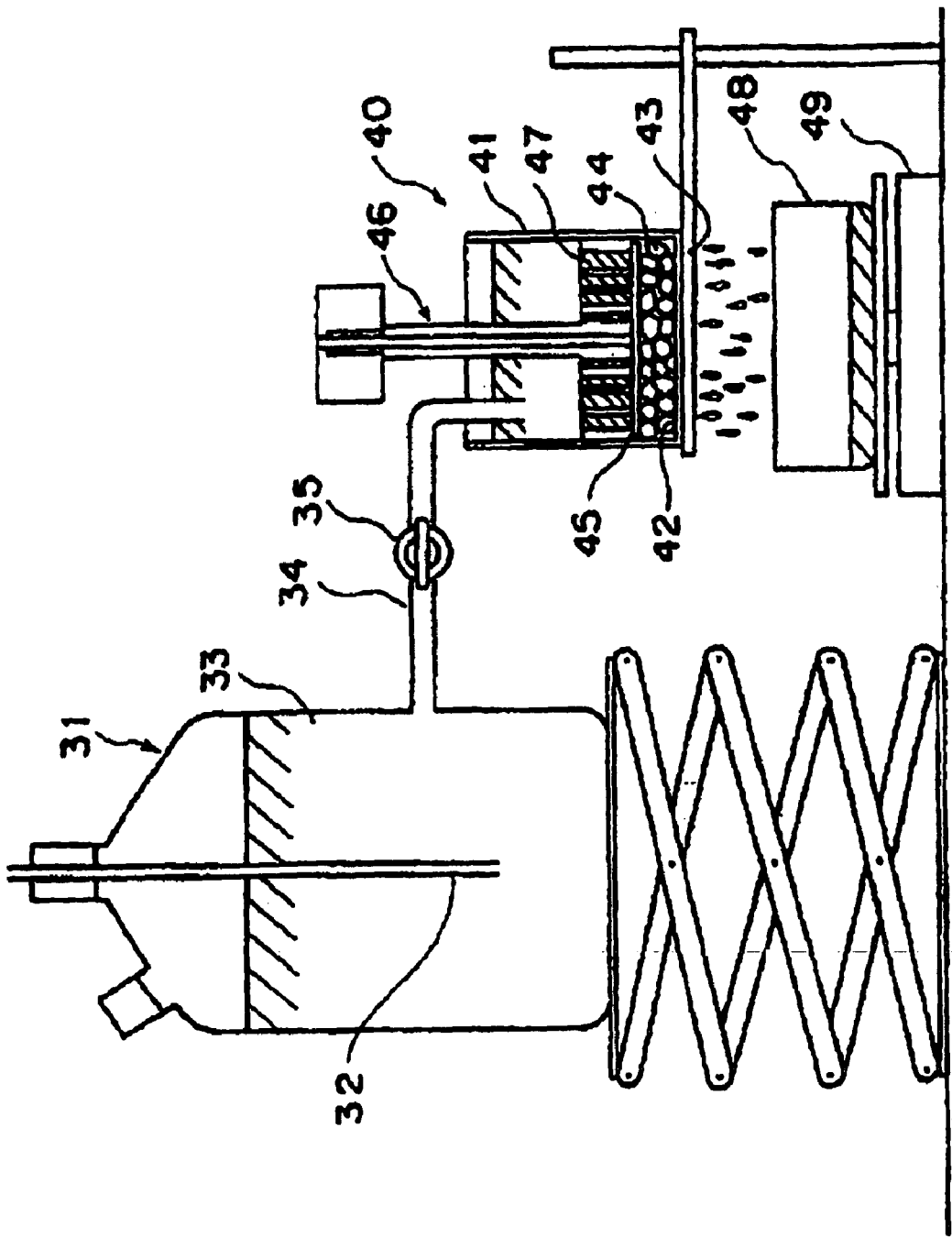
FIG. 1 is a schematic diagram of a measuring device to be used in determining the saline flow conductivity (SFC).

The first aspect of this invention is directed toward method for the surface-treatment of a water absorbent resin, which comprises:

a) mixing 100 parts by weight of the water absorbent resin, 0.01-20 parts by weight of at least one radical polymerization initiator selected from the group consisting of persulfates, hydrogen peroxide, and azo compounds, and a radically polymerizing compound; and b) irradiating the resultant mixture with active energy rays. Now, the method for the production of the modified water absorbent resin according to this invention will be described in detail below. The scope of this invention does not need to be restricted by this description but may be executed in other than the following illustrations as properly altered without departure from the purport of the invention.

(a) Water Absorbent Resin

The water absorbent resin which can be used in this invention is a crosslinked polymer having ability to swell in water and insoluble in water and, therefore, being capable of forming a hydrogel. The term "ability to swell in water" as used in this invention refers to the free swelling capacity of a given sample in an aqueous 0.9 wt. % sodium chloride solution (physiological saline), i.e. the ability of the sample to absorb the physiological saline essentially not lower than 2 g/g and preferably in the range of 5-100 g/g and more preferably in the range of 10-60 g/g. The term "insoluble in water" refers to the uncrosslinked extractable polymer (extractable polymer) in the water absorbent resin, which is preferably in the range of 0-50 wt. %, more preferably not more than 25 wt. %, still more preferably not more than 15 wt. %, and particularly preferably not more than 10 wt. %. The numerical values of the free swelling capacity and the extractable polymer are to be those which are found by the methods of determination specified in the working example cited herein below. The term "surface-treatment" refers to all physical or chemical actions performed on the water absorbent resin with the object of enabling the water absorbent resin to acquire surface crosslinkage, form pores therein, and obtain hydrophilic property or hydrophobic property, for example. In this specification, the "surface-treatment" may be referred to as "modification."

The water absorbent resin which can be used in this invention does not need to be particularly restricted but is only required to be capable of being obtained by polymerizing a monomer component essentially containing an ethylenically unsaturated monomer by means of any of the known methods.

The ethylenically unsaturated monomer is not particularly restricted but is preferred to be a monomer possessing an unsaturated double bond at the terminal thereof. As concrete examples of the monomer of this description, anionic monomers such as (meth)acrylic acid, 2-(meth)acryloyl ethane sulfonic acid, 2-(meth)acryloyl propane sulfonic acid, 2-(meth)acrylamide-2-methyl propane sulfonic acid, vinyl sulfonic acid, and styrene sulfonic acid and salts thereof; nonionic hydrophilic group-containing monomers such as (meth)acrylamide, N-substituted (meth)acrylamide, 2-hydroxyethyl (meth)acrylate, and 2-hydroxypropyl(meth)acrylate; and amino group-containing, unsaturated monomers such as N,N-dimethylaminoethyl (meth)acrylate, N,N-diethylaminoethyl(meth)acrylate, N,N-diethylaminopropyl(meth)acrylate, and N,N-dimethylaminopropyl(meth)acrylamide and quaternized products thereof may be cited. These monomers may be used either singly or in the form of a mixture of two or more members. Among monomers enumerated above, (meth)acrylic acid, 2-(meth)acryloyl ethane sulfonic acid, 2-(meth)acrylamide-2-methylpropane sulfonic acid, and salts thereof, N,N-dimethylaminoethyl(meth)acrylate and quaternized N,N-dimethylaminoethyl(meth)acrylate, and (meth)acrylamide prove preferable and acrylic acid and/or a salt thereof prove particularly preferable.

When an acrylic acid salt is used as the monomer, the monovalent salt of acrylic acid selected from among alkali metal salts, ammonium salt, and amine salt of acrylic acid proves favorable from the viewpoint of the ability of the water absorbent resin to absorb water. More preferably, the alkali metal salt of acrylic acid and particularly preferably the acrylic acid salt selected from among sodium salt, lithium salt, and potassium salt prove favorable.

In the production of the water absorbent resin, other monomer components than the monomers enumerated above may be used in amounts incapable of impairing the effect of this invention. As concrete examples of such other monomer components, hydrophobic monomers such as aromatic ethylenically unsaturated monomers having carbon numbers in the range of 8-30, aliphatic ethylenically unsaturated monomers having carbon numbers in the range of 2-20, alicyclic ethylenically unsaturated monomers having carbon numbers in the range of 5-15, and alkyl esters of (meth) acrylic acid containing alkyl groups having carbon numbers in the range of 4-50 may be cited. The proportion of such a hydrophobic monomer is generally in the range of 0-20 parts by weight based on 100 parts by weight of the ethylenically unsaturated monomer mentioned above. If the proportion of the hydrophobic monomer exceeds 20 parts by weight, the overage will possibly result in deteriorating the water absorbing property of the produced water absorbent resin.

The water absorbent resin which is used in this invention is insolubilized by the formation of an internal crosslink. This internal crosslink may be the product obtained by the self-crosslinkage using no crosslinking agent. It may be formed by using an internal crosslinking agent possessing not less than two polymerizable unsaturated group and/or not less than two reactive functional groups in the molecular unit.

The internal crosslinking agent of this description does not need to be particularly restricted. As concrete examples of the inner crosslinking agent, N,N'-methylenebis(meth)acrylamide, N-methylol (meth)acrylamide, glycidyl(meth)acrylate, (poly)ethylene glycol di(meth)acrylate, (poly)propylene glycol di(meth)acrylate, glycerin tri(meth)acrylate, glycerin acrylate methacrylate, polyvalent metal salts of (meth) acrylic acid, trimethylol propane tri(meth)acrylate, triallyl amine, triallyl cyanurate, triallyl isocyanurate, triallyl phosphate, ethylene glycol diglycidyl ether, (poly)glycerol glycidyl ether, and polyethylene glycol diglycidyl ether may be cited. These internal crosslinking agents may be used in the form of a mixture of two or more members.

The amount of the internal crosslinking agent to be used is preferably in the range of 0.0001-1 mol %, more preferably in the range of 0.001-0.5 mol %, and still more preferably in the range of 0.005-0.2 mol %. If this amount falls short of 0.0001 mol %, the shortage will result in preventing the internal crosslinking agent from being introduced into the resin. Conversely, if the amount exceeds 1 mol %, the excess will possibly result in unduly heightening the gel strength of the water absorbent resin and lowering the absorption capacity. For the introduction of the crosslinked structure into the interior of the polymer by the use of the internal crosslinking agent, it suffices to add the internal crosslinking agent into the reaction system before, during, or after the polymerization of the monomer or after neutralization of the produced polymer.

For the purpose of producing the water absorbent resin, it suffices to polymerize the monomer components including the monomer mentioned above and the internal crosslinking agent in an aqueous solution thereof. The polymerization initiators which can be used in this case are water-soluble radical polymerization initiators including persulfates such as potassium persulfate, ammonium persulfate, and sodium persulfate; potassium peracetate, sodium peracetate, potassium percarbonate, sodium percarbonate; and t-butyl hydroperoxide; hydrogen peroxide; azo compounds such as 2,2'-azobis (2-amidinopropane)-dihydrochloride and photopolymerization initiators including 2-hydroxy-2-methyl-1-phenyl-propan-1-on, for example. The water-soluble radical polymerization initiators mentioned above may be combined with a reducing agent such as a sulfite, L-ascorbic acid, or a ferric salt so as to be used as redox type initiators.

The concentration of the monomer in the aqueous monomer solution mentioned above does not need to be particularly restricted but falls preferably in the range of 15-90 wt. % and more preferably in the range of 35-80 wt. %. If this concentration falls short of 15 wt. %, the shortage will be at a disadvantage in necessitating consumption of heat and time for drying because the resultant hydrogel has an unduly large water content.

The method to be adopted for the polymerization is not particularly restricted but may be selected from among the known methods such as solution polymerization, reversed-phase suspension polymerization, precipitation polymerization, and bulk polymerization. Among these methods, the aqueous solution polymerization which comprises dissolving a monomer in an aqueous solution and polymerizing it in the aqueous solution, and the reversed phase suspension polymerization prove particularly advantageous on account of the ease of control of a polymerization reaction and the performance of a produced water absorbent resin.

In initiating the aforementioned polymerization, the polymerization initiator mentioned above is used to effect this initiation. Besides the polymerization initiator mentioned above, such active energy rays as ultraviolet rays, electron radiation, and γ rays may be used either singly or in combination with a polymerization initiator. Though the temperature in initiating the polymerization depends on the kind of polymerization initiator to be used, it falls preferably in the range of 15-130° C. and more preferably in the range of 20-120° C. If the temperature in initiating the polymerization deviates from the range mentioned above, the deviation will be at a disadvantage in increasing the residual monomer in the produced water absorbent resin and suffering the self crosslinking reaction to proceed excessively and consequently deteriorating the water absorbing property of the water absorbent resin.

The term "reversed phase suspension polymerization" refers to a method of polymerization performed on an aqueous monomer solution suspended in a hydrophobic organic solvent. It is disclosed in U.S. Pat. No. 4,093,776, No. 4367323, No. 4446261, No. 4683274, and No. 5244735, for example. The term "aqueous solution polymerization" refers to a method for polymerizing an aqueous monomer solution without using a dispersing solvent. It is disclosed in U.S. Pat. No. 4,625,001, No. 4873299, No. 4286082, No. 4973632, No. 4985518, No. 5124416, No. 5250640, No. 5264495, No. 5145906, and No. 5380808 and European Patent No. 0811636, No. 0955086, and No. 0922717, for example. The monomers and the initiators which are cited by way of illustration in these methods of polymerization can be applied to this invention.

The aqueous solution polymerization may be performed by polymerizing partially neutralized acrylic acid or polymerizing an acid-group containing monomer such as acrylic acid and subsequently neutralizing the resultant polymer with such an alkali compound as sodium hydroxide or sodium carbonate. In this case, the neutralization ratio of the produced water absorbent resin (the mol % of the neutralized acid group in the whole acid group) falls in the range of 25-100 mol % and preferably in the range of 50-90 mol %, more preferably in the range of 50-75 mol %, and most preferably in the range of 60-70 mol %.

The result of the polymerization is generally a hydrogel-like crosslinked polymer. While this invention permits this hydrogel-like crosslinked polymer in its unaltered form as a water absorbent resin, it prefers the polymer to be dried to the water content (%) [100−(solid content) (%)] which will be specifically described herein below.

The water absorbent resin which is used in this invention is preferably a powdery water absorbent resin which is obtained by polymerizing a monomer having acrylic acid (salt) particularly as its main component. The hydrogel-like crosslinked polymer which is obtained by polymerization is preferably dried and subsequently pulverized to a water absorbent resin. The drying may be effected by using a drier such as a hot air drier at a temperature in the range of 100-220° C. and more preferably in the range of 120-200° C.

For use in the pulverization, among shear primary crushers, impact shredders, and high speed rotary grinders included in the names of the powdering machines classified in Table 1.10 of Particle Technology Handbook (first edition, compiled by Particle Technology Association), the powdering machines which possess at least one of the powdering mechanisms such as cutting, shearing, striking, and rubbing can be adopted particularly favorably. Among the powdering machines which answer the foregoing description, the powdering machines which have cutting and shearing as main mechanisms can be used particularly advantageously. A roll mill (roll rotary type) powdering machine may be cited as a preferred example.

The water absorbent resin which is used in this invention is preferred to be in a powdery form. More preferably, it is a powdery water absorbent resin which contains particles of a diameter in the range of 150-850 μm (as defined by sieve classification) in a proportion falling in the range of 90-100% by weight and particularly preferably in the range of 95-100% by weight. When the surface-treated water absorbent resin having a particle diameter exceeding 850 μm is used in disposable diapers, for example, it imparts a disagreeable feel to the user's skin and possibly inflicts a rupture on the top sheet of a diaper. If the particles of a diameter smaller than 150 μm in a proportion exceeding 10% by weight based on weight of the water absorbent resin, the fine particles will scatter and clog the texture while in use and will possibly deteriorate the water absorbing property of the surface-treated water absorbent resin. The weight average particle diameter of the water absorbent resin falls in the range of 10-1,000 μm and preferably in the range of 200-600 μm. If the weight average particle diameter falls short of 10 μm, the shortage will possibly prove unfavorable in terms of safety and health. Conversely, if it exceeds 1,000 μm, the excess will possibly result in preventing the water absorbent resin from being used in disposable diapers, for example. The particle diameter mentioned above is the values determined by the method for determination of particle size distribution described in the working example cited herein below.

In addition or alternatively, the water absorbent resin to be used in this invention is preferably obtained by producing a water absorbent resin precursor having a low neutralization ratio, and mixing the water absorbent resin precursor with a base. Multifunctional surface-treatment agents have been conventionally used for the surface-treatment (surface crosslinkage). The multifunctional surface-treatment agents have such properties that they react with carboxyl groups (—COOH) in a water absorbent resin but do not react with the salt thereof (for example, —COONa). Accordingly, uniform crosslinkage can be attained by preparing an ethylenically unsaturated monomer mixture (for example, a mixture of acrylic acid with sodium acrylate) in which —COOH/—COONa ratio has been adjusted within a suitable range in advance, polymerizing the resultant mixture to produce a water absorbent resin having the —COOH and —COONa groups uniformly distributed therein, and subjecting the resultant water absorbent resin to the surface crosslinkage with a multifunctional surface-treatment agent. On the other hand, when a water absorbent resin is obtained by polymerizing a monomer mixture including an acid type ethylenically unsaturated monomer like acrylic acid as a main component, and then neutralizing the resultant polymer with an alkali compound such as sodium hydroxide and sodium carbonate, the resultant water absorbent resin has a small extractable polymer content and high gel strength. It, however, when subjected to the surface crosslinkage with a multifunctional surface-treatment agent, has deteriorated water absorbency, because the —COOH and —COONa groups are not uniformly distributed in the water absorbent resin. Accordingly, the water absorbent resin to be produced by the latter method is not desirably subjected to such a conventional surface crosslinkage with a multifunctional surface-treatment agent. According to the method of this invention, a water absorbent resin which is obtained by polymerizing a monomer or a monomer mixture including as a main component an acid type ethylenically unsaturated monomer like acrylic acid to obtain a water absorbent resin precursor having a low neutralization ratio, and then neutralizing the water absorbent resin precursor with an alkali compound such as sodium hydroxide and sodium carbonate can be modified, and the resultant modified water absorbent resin to be obtained by this method can manifest high gel strength and excellent water absorbency.

In this invention, the expression "water absorbent resin precursor having a low neutralization ratio" is referred to as a water absorbent resin precursor having a low neutralization ratio (mol % of the neutralized acid group in the whole acid group) or having no neutralized acid groups (i.e., the neutralization ratio is zero), and typically referred to as a water absorbent resin precursor having a neutralization ratio (mol % of the neutralized acid group in the whole acid group) in the approximate range of 0 to 50 mol %, more preferably in the approximate range of 0 to 20 mol %. Such a water absorbent resin precursor having a low neutralization ratio can be obtained by the same method as mentioned above by using a monomer mixture including as a main component an acid group-containing monomer like acrylic acid wherein neutralization ratio is preferably adjusted within the above range. Thus the detailed explanation of the precursor will be omitted.

The water content of the water absorbent resin to be used in the method of this invention has no particular restriction so long as the water absorbent resin possesses fluidity. The water absorbent resin after being dried at 180° C. for three hours possesses a water content falling in the range of 0-20 wt. %, preferably in the range of 0-10 wt. %, and more preferably in the range of 0-5 wt. %.

(b) Radically Polymerizing Compound

As the radically polymerizing compound which is mixed with the water absorbent resin in this invention, two kinds, i.e., the ethylenically unsaturated monomer as mentioned above and a crosslinking unsaturated monomer may be preferably cited. As used herein, the term "ethylenically unsaturated monomer" is referred to as a monomer having a vinyl group per molecule, while the term "crosslinking unsaturated monomer" is referred to as a monomer having two or more vinyl groups per molecule. The ethylenically unsaturated monomer and the crosslinking unsaturated monomer may be used either independently or in combination. Preferably, the ethylenically unsaturated monomer and the crosslinking unsaturated monomer which have been used for the production of the water absorbent resin may be used in combination. Incidentally, in this case, the molar composition ratio of these two components may be the same as or different from that of the water absorbent resin as the base polymer. Preferably, the composition is made to contain the cross-linking monomer in a larger ratio relative to the ethylenically unsaturated monomer as compared with the composition of the water absorbent resin as the base polymer. Particularly, the procedure of using acrylic acid (salt) as a main component of ethylenically unsaturated monomer and using this main component in combination with the crosslinking unsaturated monomer proves advantageous in terms of excellent water absorbing properties.

By suitably selecting the kinds of the water absorbent resin and the radically polymerizing compound to be mixed therewith, various properties including hydrophilicity, hydrophobicity, adhesiveness, biocompatibility, and the like can be imparted to the surface of the surface-treated water absorbent resin. As concrete examples of the ethylenically unsaturated monomer which may impart the hydrophilicity to the surface of the surface-treated water absorbent resin, hydroxyl group-containing monomers such as 2-hydroxyethyl (meth)acrylate, 2-hydroxypropyl(meth)acrylate, polyethyleneglycol-containing monomers such as polyethyleneglycol (meth) acrylate, polyethyleneglycol methylether (meth)acrylate may be cited. As concrete examples of the ethylenically unsaturated monomer which may impart the hydrophobicity to the surface of the surface-treated water absorbent resin, alkyl (meth)acrylates such as methyl methacrylate, stearyl(meth) acrylate, aromatic group-containing monomer such as styrene, fluorine-containing monomers such as 2,2,2-trifluoroethylmethacrylate may be cited. As concrete examples of the ethylenically unsaturated monomer which may impart the adhesiveness to the surface of the surface-treated water absorbent resin, monomers which form a polymer having a glass transition temperature of not more than 25° C. such as butyl acrylate, 2-ethyhexyl acrylate, cationic monomers such as vinylamine, allylamine, dimethylaminoethyl(meth)acrylate, (meth)acryloyloxy ethyltrimethyl ammonium chloride, silane-containing monomers such as 3-methacryloyloxy propyltrimethoxy silane may be cited. Among these monomers, silane-containing monomers may be preferably used in terms of improving not only the adhesiveness between water absorbent resin particles but also the adhesiveness of water absorbent resin particles to a substrate of metal, glass, pulp, and the like. Further, when 3-methacryloyloxy propyltrimethoxy silane is added to an aqueous solution containing partially neutralized acrylic acid, a water absorbent resin can be obtained which excels in liquid permeability as compared with the case of omitting the use of the silane compound. As concrete examples of the ethylenically unsaturated monomer which may impart the biocompatibility to the surface of the surface-treated water absorbent resin, monomers having a phospholipid-like structure such as 2-methacryloyloxy ethyl phosphorylcholine may be cited.

For the purpose of attaining the modification of properties on the surface of the water absorbent resin particles, the radically polymerizing compound desirably contains a radically polymerizing compound different from the ethylenically unsaturated monomer and the inner crosslinking agent which are used in the production of the water absorbent resin as mentioned in the above (a). In this case, an ethylenically unsaturated monomer having a different neutralization ratio from that of the ethylenically unsaturated monomer used in the production of water absorbent resin as mentioned in the above (a) may be included in the "radically polymerizing compound different from the ethylenically unsaturated monomer and the inner crosslinking agent which are used in the production of the water absorbent resin as mentioned in the above (a)". Particularly preferably, the radically polymerizing compound contains an ethylenically unsaturated monomer having at least one hetero atom other than oxygen selected from the group consisting of nitrogen, sulfur, phosphorus, silicon, and boron. By the use of such a radically polymerizing compound, the properties of the water absorbent resin particles can be remarkably modified. More preferably, ethylenically unsaturated monomers having silicon, particularly a silane group (XnSi(OR)4-n, wherein R independently stands for methyl, ethyl, phenyl or acetoxy group, for example, and n is an integer in the range of 1 to 3), phosphorus may be used. In the case of using as the radically polymerizing compound an ethylenically unsaturated monomer having at least one hetero atom other than oxygen, the amount of this monomer can be suitably selected depending on desired properties. This amount is preferably not more than 50 parts by weight, more preferably in the range of 0.01 to 20 parts by weight, most preferably in the range of 0.1 to 10 parts by weight, based on 100 parts by weight of the total amount of the radically polymerizing compound.

When the ethylenically unsaturated monomer has low water-solubility, the ethylenically unsaturated monomer can be dispersed in an aqueous solution containing a radical polymerization initiator and optionally another radically polymerizing compound, or can be dissolved in a hydrophilic organic solvent and then mixed with the aqueous solution. The resultant dispersion or solution can be added in the water absorbent resin. Alternatively, the ethylenically unsaturated monomer or a solution of the ethylenically unsaturated monomer in an organic solvent, and the aqueous solution as mentioned above can be separately added to the water absorbent resin. In this case, the order of the ethylenically unsaturated monomer to be added is not particularly limited and the ethylenically unsaturated monomer may be added to the water absorbent resin either before or after the addition of the aqueous solution.

In respect of the water absorption properties and also in the economical point of the surface-treated water absorbent resin, the radically polymerizing compound preferably contains acrylic acid and/or an alkali metal salt of acrylic acid. In this case, the amount of the acrylic acid and/or an alkali metal salt of acrylic acid can be suitably selected depending on desired properties, and is not particularly limited. It is preferably not less than 50 parts by weight, more preferably in the range of 70 to 90 parts by weight, based on 100 parts by weight of the total amount of the radically polymerizing compound.

Further, the crosslinking unsaturated monomer which can be used in this invention, though not particularly limited, includes monomers cited as the inner crosslinking agent to be used in the production of water absorbent resin and 2-hydroxy-1-acryloxy-3-methacryloxypropane, for example. Among these monomers, polyethylene glycol diacrylate and 2-hydroxy-1-acryloxy-3-methacryloxypropane may be preferably used. Although the amount of the crosslinking unsaturated monomer in such a case can be suitably selected depending on desired properties, it is preferably in the range of 0.05 to 20 mol %, more preferably in the range of 0.1 to 10 mol %, most preferably in the range of 0.3 to 5 mol %, based on the total amount of the radically polymerizing compound.

The radically polymerizing compounds cited above may be used singly or in the form of a mixture of two or more compounds. In the latter case, the combination of these radically polymerizing compounds may be suitably selected and is not particularly limited.

The amount of the radically polymerizing compound to be used is preferably in the range of 1-9 parts by weight and more preferably in the range of 2-6 parts by weight, based on 100 parts by weight of the water absorbent resin. If the amount of the radically polymerizing compound falls short of 1 weight part, the shortage would possibly prevent the absorption capacity of the water absorbent resin under pressure from being fully exalted. Conversely, if this amount exceeds 9 parts by weight, the overage would possibly result in lowering the absorption ratio of the produced surface treated water absorbent resin. The amount of the crosslinking unsaturated monomer which is contained in the radically polymerizing compound in this case is not more than 50 parts by weight, preferably in the range of 0.01-10 parts by weight, and more preferably in the range of 0.1-10 parts by weight, based on 100 parts by weight of the ethylenically unsaturated monomer. The combined use of the crosslinking unsaturated monomer enables the absorption ratio under pressure to be exalted further. Though the reason for the exaltation of the absorption ratio under pressure which results from the combined use of the crosslinking unsaturated monomer is not definitely clear, it may be inferred that the water-soluble ethylenically unsaturated monomer forms a crosslinking structure during the course of polymerization due to the use of the crosslinking unsaturated monomer and then the crosslinking structure is introduced into the surface of the water absorbent resin.

(c) Radical Polymerization Initiator

In this invention, persulfates, hydrogen peroxide, and azo compounds can be used as the radical polymerization initiator. As concrete examples thereof, persulfates such as ammonium persulfate, sodium persulfate, and potassium persulfate; hydrogen peroxide; and water-soluble azo compounds such as 2,2'-azobis-2-amidinopropane dihydrochloride and 2,2'-azobis[2-2(-imidazolin-2-yl)propane]dihydrochloride may be cited. The use of a persulfate particularly among them proves favorable in respect that the modified water absorbent resin excels in the absorbency against pressure, the saline flow conductivity, and the free swelling capacity.

In this invention, the radical polymerization initiator is preferably either a water soluble radical polymerization initiator or a heat-degradable radical polymerization initiator.

Among these radical polymerization initiators, the water soluble radical polymerization initiator may be used preferably because it can be easily dispersed uniformly on the surface of the water absorbent resin which excels in hydrophilic property and water absorbing property, to produce a water absorbent resin which excels in the water absorbing property.

The water-soluble radical polymerization initiator to be used in this invention possesses solubility of not less than 1 wt. %, preferably not less than 5 wt. %, and more preferably not less than 10 wt. % in water (25° C.). As concrete examples of the water-soluble radical polymerization initiator applying to this description, persulfates such as ammonium persulfate, sodium persulfate, and potassium persulfate; hydrogen peroxide; and water-soluble azo compounds such as 2,2'-azobis-2-amidinopropane dihydrochloride and 2,2'-azobis[2-2(-imidazolin-2-yl)propane]dihydrochloride may be cited. The use of a persulfate particularly among them proves favorable in respect that the modified water absorbent resin excels in the absorbency against pressure, the saline flow conductivity, and the free swelling capacity.

The amount of the radical polymerization initiator to be used is not restricted. In this invention, the amount of the radical polymerization initiator is preferably in the range of 0.01-20 parts by weight, more preferably in the range of 0.1-15 parts by weight, and particularly preferably in the range of 1-10 parts by weight, based on 100 parts by weight of the water absorbent resin. If the amount of the radical polymerization initiator to be mixed falls short of 0.01 weight part, the shortage would possibly prevent the water absorbent resin from acquiring excellent absorption properties in spite of irradiation with active energy rays. Conversely, if this amount exceeds 20 parts by weight, the overage would possibly result in deteriorating water absorption capacity of the modified water absorbent resin.

While this invention essentially uses a radical polymerization initiator selected from among persulfates, hydrogen peroxide, and water-soluble azo compounds, it may use additionally an initiator other than the radical polymerization initiator. As concrete examples of the other polymerization initiator which can be additionally used as described above, photopolymerization initiators such as oil-soluble benzoin derivatives, benzyl derivatives, and acetophenone derivatives and oil-soluble organic peroxides such as oil-soluble ketone peroxide, peroxyketal, hydroperoxide, dialkyl peroxide, peroxy esters, and peroxycarbonate may be cited. These photopolymerization initiators may be commercially available products such as, for example, the products of Ciba Specialty Chemicals sold under the trademark designations of Irgacure 184 (hydroxycyclohexyl-phenyl ketone) and Irgacure 2959 (1-[4-(2-hydroxyethoxy)-phenyl]-2-hydroxy-2-methyl-1-propan-1-on).

In addition to the above other initiator, or in place of the above other initiator, percarbonates such as sodium percarbonate; peracetates such as peracetic acid, and sodium peracetate can be further used.

When this invention necessitates additional use of other initiator, the amount of the initiator to be used falls in the range of 0-20 parts by weight, preferably in the range of 0-15 parts by weight, and particularly preferably in the range of 0-10 parts by weight, based on 100 parts by weight of the water absorbent resin. This rate of use corresponds to a smaller amount than the radical polymerization initiator such as, for example, not more than ½, further not more than ¹⁄₁₀, and particularly not more than ¹⁄₅₀ of the weight ratio of the radical polymerization initiator.

In this invention, it has been found that a heat-degradable polymerization initiator having a specific 10 hour half-life decomposition temperature can manifest effects similar to those by the water-soluble radical polymerization initiator as mentioned above. As used herein, the term "heat-degradable radical polymerization initiator" is referred to as a compound which generates a radical by heating. A heat-degradable radical polymerization initiator having 10 hour half-life decomposition temperature in the range of 0 to 120° C., more preferably 20 to 100° C., is preferably used in this invention. In consideration of temperature during the irradiation with active energy rays, a heat-degradable radical polymerization initiator having 10 hour half-life decomposition temperature in the range of 40 to 80° C. is particularly preferably used in this invention. If the lower limit of 10 hour half-life decomposition temperature is less than 0° C., the heat-degradable radical polymerization initiator is too unstable during the storage. Conversely, if the upper limit thereof exceeds 120° C., the chemical stability of the heat-degradable radical polymerization initiator is too high and results in lowered reactivity.

The heat-degradable radical polymerization initiator has advantages in respect that it is relatively inexpensive and the process and devices for the production thereof can be simplified because the strict light-shielding is not always required, as compared with a compound which has been commercially available as a photo-degradable radical polymerization initiator. As typical examples of the heat-degradable radical polymerization initiator, persulfates such as sodium persulfate, ammonium persulfate, and potassium persulfate; hydrogen peroxide; and azo compounds such as 2,2'-azobis(2-amidinopropane) dihydrochloride, 2,2'-azobis[2-2(-imidazolin-2-yl)propane]dihydrochloride, and 2,2'-azobis(2-methylpropionitrile) may be cited. Among the heat-degradable radical polymerization initiators cited above, persulfates including sodium persulfate, ammonium persulfate, and potassium persulfate, and azo compounds including 2,2'-azobis(2-amidinopropane) dihydrochloride, 2,2'-azobis[2-2(-imidazolin-2-yl)propane]dihydrochloride, and 2,2'-azobis(2-methylpropionitrile) which have 10 hour half-life decomposition temperature in the range of 40 to 80° C. can be used preferably. Particularly, persulfates may be preferably used in respect of excellent absorbency of physiological saline against pressure, saline flow conductivity, and free swelling capacity.

This invention has a feature in using "a heat-degradable radical polymerization initiator". This is because by adding to a water absorbent resin a polymerization initiator having a specific 10 hour half-life decomposition temperature and then irradiating the resultant mixture with active energy rays, the surface crosslinkage can be carried out at a low temperature for a short period of time and the resultant modified water absorbent resin can manifest high gel strength and excellent water-absorbing properties. The heat-degradable radical polymerization initiator to be used in this invention may be either oil-soluble or water-soluble. The decomposition rate of an oil-soluble heat-degradable radical polymerization initiator is less sensitive to a pH value and ion strength as compared to that of a water-soluble heat-degradable radical polymerization initiator. However, a water-soluble heat-degradable radical polymerization initiator may be more preferably used in respect of its permeability to a water absorbent resin because the water absorbent resin is hydrophilic.

The amount of the heat-degradable radical polymerization initiator falls preferably in the range of 0.01-20 weight parts, more preferably in the range of 0.1-15 weight parts, and particularly preferably in the range of 1-10 weight parts, based on 100 weight parts of the water absorbent resin. If the amount of the heat-degradable radical polymerization initiator to be mixed falls short of 0.01 weight part, the shortage will possibly result in preventing the water absorbent resin from being modified even by the exposure to the active energy rays. Conversely, if the amount of the heat-degradable radical polymerization initiator to be mixed exceeds 20 weight parts, the overage will possibly result in deterioration of the water absorbing property of the modified water absorbent resin.

In this invention, a heat-degradable radical polymerization initiator including persulfate, hydrogen peroxide and a heat-degradable azo compound, is used. In this case, two or more persulfates having different counterions can be used in combination, as well as a persulfate can be used solely. Further, an initiator other than the heat-degradable radical polymerization initiator can be additionally used. As typical examples of the other initiator used herein, photo polymerization initiators such as oil-soluble benzoin derivatives, benzyl derivatives, and acetophenone derivatives may be cited. A commercially available photo polymerization initiator may be used and such commercially available photo polymerization initiators include products of Ciba Specialty Chemicals sold under the trademark designations of Irgacure 184 (hydroxycyclohexyl-phenyl ketone) and Irgacure 2959 (1-[4-(2-hydroxyethoxy)-phenyl]-2-hydroxy-2-methyl-1-propan-1-on), for example.

In addition to the above other initiator, or in place of the above other initiator, percarbonates such as sodium percarbonate; peracetates such as peracetic acid, and sodium peracetate can be further used.

When this invention necessitates additional use of other initiator, the amount of the initiator to be used falls in the range of 0-20 weight parts, preferably in the range of 0-15 weight parts, and particularly preferably in the range of 0-10 weight parts, based on 100 weight parts of the water absorbent resin. This rate of use corresponds to a smaller amount than the heat-degradable radical polymerization initiator such as, for example, not more than ½, further not more than ¹⁄₁₀, and particularly not more than ¹⁄₅₀ of the weight ratio of the heat-degradable radical polymerization initiator.

(d) Mixing of Water Absorbent Resin, Radical Polymerization Initiator, and Radically Polymerizing Compound When the radical polymerization initiator and the radically polymerizing compound are mixed with the water absorbent resin, the sequence of this mixture is not restricted. Thus, they may be independently mixed with the water absorbent resin. Otherwise, the mixing may be effected by preparing an aqueous solution containing the radical polymerization initiator and the radically polymerizing compound and then mixing this aqueous solution with the water absorbent resin. For the purpose of uniformly dispersing these components on the surface of the water absorbent resin, however, the procedure of preparing in advance the aqueous solution containing the radical polymerization initiator and the radically polymerizing compound and subsequently mixing this aqueous solution with the water absorbent resin proves advantageous. It is alternatively permissible to mix the radically polymerization initiator and the radically polymerizing compound with the water absorbent resin and then mixing the resultant mixture with water.

The aqueous solution for dissolving the radical polymerization initiator and the radically polymerizing compound may contain, besides water, other solvent in an amount incapable of impairing the solubility of such components.

The amount of the aqueous solution to be used falls in the range of 1-20 parts by weight based on 100 parts by weight (as reduced to 100 wt. % of the solid content) of the water absorbent resin. If the amount of the aqueous solution falls short of 1 weight part, the shortage would possibly result in preventing the surface crosslinkage from being sufficiently effected even when the radical polymerization initiator is exposed to the active energy rays. Conversely, if the amount of the aqueous solution exceeds 20 parts by weight, the overage would be at a disadvantage in necessitating consumption of unduly large amount of energy at the drying step which follows the exposure to the active energy rays. The overage will possibly induce the water absorbent resin to decompose. The aqueous solution can be used for the purpose of dissolving the radical polymerization initiator. After the radical polymerization initiator and the water absorbent resin are mixed together, the resultant mixture may be mixed with water or the aqueous solution at a ratio falling in the range mentioned above. Likewise, the crosslinked hydrogel obtained by polymerizing the monomer components and then dried to a water content in the range of 0-20 wt. % can be directly mixed with the radical polymerization initiator.

For the purpose of exalting the mixing property of the aqueous solution with the water absorbent resin, a mixing aid other than water is preferably added. Although the time of adding a mixing aid is not particularly limited, the mixing aid is preferably added at the same time as or prior to the step a) mixing a water absorbent resin with a radical polymerization initiator. Here, the mixing aid other than water is not particularly limited, as long as it is a water-soluble or water-dispersible compound except an ethylenically unsaturated monomer or a radical polymerization initiator, and it can repress the agglomeration of the water absorbent resin with water and improve the mixing of the aqueous solution with the water absorbent resin. The mixing aid is preferably a water-soluble or water-dispersible compound. As such a water-soluble or water-dispersible compound, surfactants, water-soluble polymers, hydrophilic organic solvents, water-soluble inorganic compounds, inorganic acids, inorganic acid salts, organic acids, and organic acid salts can be typically used. In this specification, the term "water-soluble compound" is referred to as a compound having solubility in 100 g of water at room temperature of not less than 1 g, preferably not less than 10 g. Since the addition of the mixing aid can repress the agglomeration of the water absorbent resin with water, and induce the uniform mixing of the aqueous solution with the water absorbent resin, the active energy rays, when irradiated in the subsequent step, can be irradiated equally and evenly to the water absorbent resin and thus the uniform surface crosslinkage of the entire water absorbent resin can be attained. The mixing aid which can be used in this case is not particularly restricted so long as it is capable of repressing the agglomeration of the water absorbent resin with water and enhancing the mixing of the aqueous solution with the water absorbent resin. Specifically, surfactants, water-soluble polymers, hydrophilic organic solvents, water-soluble inorganic compounds, inorganic acids, inorganic acid salts, organic acids, and organic acid salts can be used.

The form of the mixing aid to be used is not particularly limited, and it may be used in a powdery form, or may be dissolved, dispersed, or suspended in a solution. Preferably, it is used in the form of an aqueous solution.

Further, the order of the addition of the mixing aid is not also particularly limited. Any method such as a method which comprises adding a mixing aid to a water absorbent resin and then adding and mixing an aqueous solution to the mixture, and a method which comprises dissolving a mixing aid in an aqueous solution, and simultaneously mixing the resultant solution with a water absorbent resin can be used.

As the surfactant to be used herein, at least one kind of surfactant which is selected from the group consisting of nonionic surfactants or anionic surfactants possessing an HLB of not less than 7 may be adopted. As concrete examples of such surfactants, sorbitan aliphatic esters, polyoxyethylene sorbitan aliphatic esters, polyglycerinaliphatic esters, polyoxyethylene alkyl ethers, polyoxyethylene alkylphenol ethers, polyoxyethylene acyl esters, sucrose aliphatic esters, higher alcohol sulfuric esters, alkyl naphthalene sulfonates, alkylpolyoxyethylene sulfate, and dialkyl sulfosuccinates may be cited. Among these surfactants, polyoxyethylene alkyl ethers can be preferably used. The number average molecular weight of the polyoxyethylene alkyl ether is preferably in the range of 200 to 100,000, more preferably in the range of 500 to 10,000. If the number average molecular weight is too large, the solubility in water decreases and thus the mixing with the water absorbent resin becomes inefficient because the concentration of the surfactant in the solution can not be increased and the viscosity of the solution is also increased. Conversely, if the number average molecular weight is too small, the surfactant becomes less effective as a mixing aid.

As concrete examples of the water-soluble polymer, polyvinyl alcohol, polyethylene oxide, polyethylene glycol, polypropylene glycol, polyacrylamide, polyacrylic acid, sodium polyacrylate, polyethylene imine, methyl cellulose, carboxymethyl cellulose, hydroxyethyl cellulose, hydroxypropyl cellulose, dextrin, sodium alginate, and starch may be cited. Among these polymers, polyethylene glycol can be preferably used. The number average molecular weight of the polyethylene glycol, like polyoxyethylene alkyl ether, is preferably in the range of 200 to 100,000, more preferably in the range of 500 to 10,000.

As concrete examples of the hydrophilic organic solvent, alcohols such as methyl alcohol, ethyl alcohol, propyl alcohol, isopropyl alcohol, butyl alcohol, isobutyl alcohol, and t-butyl alcohol; ketones such as acetone and methylethyl ketone; ethers such as dioxane, alkoxy (poly) ethylene glycol, and tetrahydrofuran; amides such as e-caprolactam and N,N-dimethylformamide; sulfoxides such as dimethylsulfoxide; and polyhydric alcohols such as ethylene glycol, diethylene glycol, propylene glycol, triethylene glycol, tetraethylene glycol, 1,3-propane diol, dipropylene glycol, 2,2,4-trimethyl-1,3-pentane diol, glycerin, 2-butene-1,4-diol, 1,3-butane diol, 1,4-butane diol, 1,5-pentane diol, 1,6-hexane diol, 1,2-cyclohexane dimethanol, 1,2-cyclohexanol, trimethylol propane, diethanol amine, triethanol amine, polyoxypropylene, pentaerythritol, and sorbitol may be cited. These hydrophilic organic solvents may be used either singly or in the form of a mixture of two or more members.

As concrete examples of the water-soluble inorganic compound, alkali metal salts such as sodium chloride, sodium hydrogen sulfate, and sodium sulfate, ammonium salts such as ammonium chloride, ammonium hydrogen sulfate, and ammonium sulfate, alkali metal hydroxides such as sodium hydroxide and potassium hydroxide, polyvalent metals such as aluminium chloride, polyaluminum chloride, aluminium sulfate, potassium alum, calcium chloride, alkoxy titanium, zirconium ammonium carbonate, zirconium acetate, and non-reducible alkali metal salt pH buffer agents such as hydrogencarbonate, dihydrogen phosphate, and monohydrogen phosphate may be cited.

Further, as concrete examples of the inorganic acid (salt), hydrochloric acid, sulfuric acid, phosphoric acid, carbonic acid, and boric acid, and the salts thereof, for example, alkali metal salts thereof, and alkali earth metal salts thereof may be cited. As concrete examples of the organic acid (salt), acetic acid, propionic acid, lactic acid, citric acid, succinic acid, malic acid, and tartaric acid, and the salts thereof, for example, alkali metal salts thereof, and alkali earth metal salts thereof may be typically cited.

Among the compounds cited above, polyoxyethylene alkyl ethers, polyethylene glycol, water-soluble polyvalent metals, sodium chloride, ammonium hydrogen sulfate, ammonium sulfate, sulfuric acid, and hydrochloric acid may be preferably used as the mixing aid.

These mixing aids can be used singly or in the mixed form of two or more members. The amount of the mixing aid to be added is not particularly limited as long as it represses the aggregation of the water absorbent resin with water, and improves the mixing of the aqueous solution with the water absorbent resin, as mentioned above. Typically, the mixing aid is preferably added in an amount in the range of 0.01 to 40 parts by weight, more preferably 0.1 to 5 parts by weight, to 100 parts by weight of the water absorbent resin. Alternatively, in this invention, the mixing aid may be used in an aqueous solution form with a concentration in the range of 0-40 wt. %, more preferably in the range of 0.01-30 wt. %, and still more preferably in the range of 0.1-10 wt. %, based on the whole amount of the aqueous solution.

As regards the method for mixing the water absorbent resin with the radically polymerizing compound and the radical polymerization initiator, a method which effects the mixture by the use of an ordinary mixing device such as, for example, V-shape mixer, ribbon type mixer, screw type mixer, rotary circular plate type mixer, air-current type mixer, batch kneader, continuous kneader, paddle type mixer, or space type mixer may be cited as an example.

(e) Active Energy Rays

The fact that in the production of a water absorbent resin, the rate of polymerization is exalted by the exposure to active energy rays belongs to the public knowledge. For example, by compounding a polymerizable monomer component and an internal crosslinking agent and a photopolymerization initiator together and irradiating the resultant mixture with active energy rays such as ultraviolet rays, electron radiation, or γ rays, it is made possible to prepare an insoluble water absorbent resin possessing internal crosslinks. Then, as a method for crosslinking the surface of a water absorbent resin, the formation of a surface crosslinkage attained by using a surface crosslinking agent and promoting the relevant reaction by application of heat is known to the public. For the surface crosslinkage of the water absorbent resin, compounds such as polyhydric alcohols, polyvalent glycidyl ethers, haloepoxy compounds, and polyvalent aldehydes which possess a plurality of functional groups in the molecular unit are used. Generally, by heating at 100-300° C., these functional groups are enabled to react with the carboxyl group present on the surface of the water absorbent resin and give rise to a crosslinked structure on the surface of the water absorbent resin. According to this invention, however, a water absorbent resin having excellent water absorption properties can be obtained by the presence of a polymerizable monomer, the use of the radical polymerization initiator and the exposure of the active energy rays without requiring the presence of such a surface crosslinking agent. Such a surface-treatment is believed to be able to form a crosslinking structure on the surface of the water absorbent resin. The radical polymerization initiator may be activated by heating, for example, as well as by being irradiated with the active energy rays. It has been demonstrated, however, that the activation by heating is not enough for implementing the surface-treatment by the procedure of mixing the radically polymerizing compound together with the water absorbent resin and causing the radical polymerization initiator to act on the resultant mixture. As shown in the working example which is specifically described herein below, the produced water absorbent resins manifest varying absorption properties. While the reason for the variation of absorption properties is not clear, this variation may be inferred that the heating is not enough for the formation of radicals by the use of the radical polymerization initiator and that the radicals in a sufficient amount for the surface-treatment is formed solely by the active energy rays.

In this invention, the irradiation of the active energy rays may be carried out during the course of mixing the water absorbent resin and the radical polymerization initiator or subsequent to the mixture of these two components. From the viewpoint of forming a uniform surface crosslinkage, however, it is preferred to adopt a method which comprises preparing a mixture of a water absorbent resin and an aqueous solution containing a water soluble radical polymerization initiator and irradiating the resultant mixture with active energy rays.

As concrete examples of the active energy rays, ultraviolet rays, electron radiation, and γ rays may be cited. These active energy rays may be used either singly or in the form of a combination of two or more members. Among these active energy rays, ultraviolet rays and electron radiation prove advantageous. In consideration of the influence of active energy rays on the human body, the ultraviolet rays prove preferable and the ultraviolet rays possessing a wavelength not exceeding 300 nm and particularly preferably falling in the range of 180-290 nm prove more preferable. As regards the conditions of the irradiation, when the ultraviolet rays are used, preferably the intensity of irradiation falls in the range of 3-1000 mW/cm$^2$ and the dose falls in the range of 100-10000 mJ/cm$^2$. As concrete examples of the device for irradiating the ultraviolet rays, high-pressure mercury-vapor lamp, low-pressure mercury-vapor lamp, metal halide lamps, xenon lamp, and halogen lamps may be cited. So long as the ultraviolet rays, preferably the ultraviolet rays of a wavelength of not more than 300 nm, are used, it may contain other radiation and wavelength and the procedure is not particularly restricted. When the electron radiation is used, preferably the voltage of acceleration falls in the range of 50-800 kV and the absorbed dose in the range of 0.1-100 Mrad. Generally, the duration of the irradiation of the active energy rays is preferably not less than 0.1 minute and less than 60 minutes, more preferably not less than 0.2 minute and less than 30 minutes, and more preferably not less than 1 minute and less than 15 minutes. This duration possibly exceeds 60 minutes when the conventional surface crosslinking agent is used. For the fixed crosslink density, this invention can decrease the duration of the surface crosslinking treatment.

In this invention, when the surface treatment is effected by the irradiation of the active energy rays, no application of heat is required. The irradiation with the active energy rays, however, may be carried out on heating. By this heating, the water absorbent resin excelling in water absorption properties can be obtained. The temperature of this heating is preferably in the range of 0-150° C., more preferably in the range of 10-120° C., still more preferably in the range of room temperature –100° C., and particularly preferably in the range of 50-100° C. Incidentally, the radiation of the active energy rays possibly results in inducing generation of radiant heat. In this case, the radiation with the active energy ray may be carried out on heating. According to this invention, since the radical polymerization initiator is activated by the radiation with the active energy rays, the heating serves to play an auxiliary role. Thus, the temperature of surface-treatment can be set at a lower level than the conventional temperature of surface-treatment. Incidentally, as means for heating, a method which comprises introducing a heated gas into the device for the irradiation with the active energy rays, a method which comprises heating the periphery of the device for the radiation with the active energy rays as with a jacket, a method which comprises heating the radiant heat generated during the radiation with the active energy rays, and a method which comprises irradiating a preheated water absorbent resin with the active energy rays can be used.

During the irradiation of the active energy rays, the water absorbent resin is preferably kept stirred. By this stirring, it is made possible to irradiate the mixture of the radical polymerization initiator and the water absorbent resin uniformly with the active energy rays. As concrete examples of the device for stirring the water absorbent resin during the irradiation of the active energy rays, shaking mixer, shaking feeder, ribbon type mixer, conical ribbon type mixer, screw type mixing extruder, air current type mixer, batch kneader, continuous kneader, paddle type mixer, high-speed fluidifying mixers, and buoyant fluidifying mixer may be cited.

It is generally known that a reaction involving a radical as an active species is inhibited by oxygen. In the method of production according to this invention, however, the solid state properties of the surface-treated water absorbent resin do not decrease when oxygen is present in the system. From this fact, it is concluded that during the irradiation of the active energy rays, the atmosphere used for enclosing the reaction system does not need to be inert.

(f) Other Treatment

After the irradiation of the active energy rays, the water absorbent resin may be optionally subjected to a heat treatment at a temperature in the range of 50-250° C. as for the purpose of drying.

Further, after the irradiation of the active energy rays, the water absorbent resin may be endowed with a surface crosslinkage by the use of any of the conventionally known surface crosslinking agents such as polyhydric alcohols, polyvalent epoxy compounds, and alkylene carbonates.

In the method for the surface-treatment of the present invention, the water absorbent resin may be added with an agent for enhancing the flow of fluid after the irradiation with the active energy rays. As concrete examples of the fluidity enhancer, minerals such as talc, kaolin, fuller's earth, bentonite, activated clay, cawk, natural asphaltum, strontium ore, ilmenite, and pearlite; aluminum compounds such as aluminum sulfates 14-18 hydrates (or anhydrides), potassium aluminum sulfates 12 hydrate, sodium aluminum sulfate 12 hydrate, aluminum chloride, aluminum polychloride, and aluminum oxide, and aqueous solutions thereof; other polyvalent metal salts; hydrophilic amorphous silicas (such as, for example, the product of the dry method made by Tokuyama K.K. and sold under the trademark designation of "Reolosil QS-20" and the products of the precipitation method made by DEGUSSA Corp. and sold under the trademark designation of "Sipernat 22S and Sipernat 1200"); and oxide composites such as silicon oxide.aluminum oxide.magnesium oxide composite (such as, for example, the product of ENGELHARD Corp. sold under the trademark designation of "Attagel #50), silicon oxide.aluminum oxide composite, and silicon oxide.magnesium oxide composite may be cited. Such a fluidity enhancer in an amount falling preferably in the range of 0-20 parts by weight, more preferably in the range of 0.01-10 parts by weight, and particularly preferably in the range of 0.1-5 parts by weight is mixed with 100 parts by weight of the water absorbent resin which has been modified. The fluidity enhancer can be added in the form of aqueous solution when it is soluble in water or in the form of powder or slurry when it is insoluble. The fluidity enhancer may be added in the form mixed with a radical polymerization initiator. Other additives such as antibacterial agent, deodorant, and chelating agent may be properly used additionally in an amount falling in the range mentioned above.

(g) Surface-Treated Water Absorbent Resin

According to this invention, a water absorbent resin having the surface thereof crosslinked can be produced by applying the method for the surface-treatment as mentioned above to a water absorbent resin. The produced water absorbent resin can gain improved absorbency against pressure. Accordingly, the present invention is to provide a water absorbent which is obtained by the method of this invention wherein the water absorbent resin is produced by using an ethylenically unsaturated monomer and an inner crosslinking agent, and the radically polymerizing compound contains a compound different from the ethylenically unsaturated monomer and the inner crosslinking agent. The present invention also is to provide a water absorbent which is obtained by the method of this invention wherein the radically polymerizing compound contains an ethylenically unsaturated monomer having a hetero atom other than oxygen. In this aspect, as mentioned above, the ethylenically unsaturated monomer having a hetero atom other than oxygen preferably contains an ethylenically unsaturated monomer having silicon, more preferably silane, and/or phosphorus. Further, the present invention is to provide a water absorbent which is obtained by mixing 100 parts by weight of a water absorbent resin, 0.01-20 parts by weight of a radical polymerization initiator, and a radically polymerizing compound containing acrylic acid and/or an alkali metal salt of acrylic acid, and irradiating the resultant mixture with active energy rays. In this aspect, as mentioned above, the acrylic acid and/or an alkali metal salt of acrylic acid is contained in an amount of not less than 50 parts by weight in 100 parts by weight of the radically polymerizing compound It has been hitherto known that the formation of surface crosslinkage results in slightly lowering the free swelling capacity but exalting the ability to retain the absorbed liquid even in a pressed state, namely the absorbency against pressure. By the method of this invention, the absorbency against pressure of 4.83 kPa of the water absorbent resin is improved by not less than 1 g/g comparing with the absorption against pressure of the resin prior to the surface-treatment, even in the absence of a surface-crosslinking agent. This fact is thought to indicate that the method of this invention has introduced a crosslinked structure to the surface of the water absorbent resin. As the properties after the modification, this improvement is preferably not less than 8 g/g, more preferably not less than 12 g/g, still more preferably not less than 15 g/g, and particularly preferably not less than 20 g/g, most preferably not less than 22 g/g. The surface-crosslinked water absorbent resin to be produced by using the method for the surface-treatment of this invention exhibits the absorbency against pressure of 4.83 kPa in the range of 8-40 g/g. Though the upper limit of this absorbency against pressure does not particularly matter, the neighborhood of 40 g/g may prove sufficient at times on account of the rise of cost due to the difficulty of production.

Then, the free swelling capacity (GV) is preferably not less than 8 g/g, more preferably not less than 15 g/g, still more preferably not less than 20 g/g, and particularly preferably not less than 25 g/g. Though the upper limit is not particularly restricted, it is preferably not more than 50 g/g, more preferably not more than 40 g/g, and still more preferably not more than 35 g/g. If the free swelling capacity (GV) falls short of 8 g/g, the water absorbent resin will not fit use for such sanitary materials as disposable diapers because of an unduly small amount of absorption. Conversely, if the free swelling capacity (GV) exceeds 50 g/g, the overage will possibly result in preventing the produced water absorbent resin from acquiring an excellent ability to pass fluid because of deficiency in gel strength.

The surface-treated water absorbent resin which is obtained by this invention possesses a property of saline flow conductivity (SFC) preferably not less than 10 ($\times 10^{-7} \cdot cm^3 \cdot s \cdot g^{-1}$), more preferably not less than 30 ($\times 10^7 \cdot cm^3 \cdot s \cdot g^1$), and still more preferably not less than 50 ($\times 10^{-7} \cdot cm^3 \cdot s \cdot g^{-1}$). These numerical values are to be determined by the method specified in the working example cited herein below.

The form of the surface-treated water absorbent resin which is obtained by this invention can be properly adjusted by the conditions of treatment such as the form of the water absorbent resin before the treatment and the agglomeration and molding of the treated water absorbent resin after the treatment. Generally, however, the modified water absorbent resin has a powdery form. This powder has a weight average particle diameter (specified by classification with sieves) which falls in the range of 10-1,000 μm and preferably in the range of 200-600 μm. In this powder, the content of particles having diameters of 150-850 μm falls preferably in the range of 90-100% by weight and more preferably in the range of 95-100% by weight based on the weight of the water absorbent resin.

The method of this invention, during the course of surface crosslinking the water absorbent resin, manifests an effect of agglomerating the fine powder which occurs during the production of the modified water absorbent resin. Thus, even when the water absorbent resin prior to the surface-treatment happens to contain the fine powder, the method of this invention for producing the modified water absorbent resin is capable of agglomerating the contained fine powder and, therefore, decreasing the amount of the fine powder to be contained in the resultant modified water absorbent resin. The particle size distribution of the produced modified water absorbent resin is shifted toward a higher particle size as compared with the water absorbent resin prior to the surface-treatment. The degree of the shift, however, varies with the kind and amount of the radical polymerization initiator to be mixed with the water absorbent resin and, when it is added as an aqueous solution, with the water content, the conditions of irradiation of the active energy rays, and the method for fluidization during the irradiation.

The surface-treated water absorbent resin which is obtained by the method of this invention has a higher crosslink density in the neighborhood of the surface than in the interior, preferably has a surface crosslinkage formed uniformly at a high density throughout on the entire surface of the water absorbent resin and is enabled to exalt to extremely high levels such characteristic properties as absorption capacity, absorption speed, gel strength, and suction force which the water absorbent resin is expected to possess.

Further, in accordance with this invention, the surface treatment of the water absorbent resin is effected fully satisfactorily even at a reaction temperature in the neighborhood of room temperature and the surface-treated water absorbent resin consequently obtained is enabled to manifest at extremely high levels such characteristic properties as absorption capacity, absorption speed, gel strength, and suction force which the water absorbent resin is expected to possess. The water absorbent resin which is obtained by this invention, therefore, is optimally usable for sanitary cotton, disposable diapers, and other sanitary materials for absorbing body fluid and for agricultural activities.

EXAMPLES

Now, this invention will be described more specifically below with reference to working examples and comparative examples. This invention is not limited thereto. Hereinafter, the "parts by weight" may be expressed simply as "parts" and the "liters" simply as "L" for the sake of convenience. The method of determination and the method of evaluation indicated in the working examples and the comparative example will be shown below.

(1) Particle Size Distribution

Ten gram samples of a given water absorbent resin before the surface treatment and after the surface treatment were classified with test sieves having a diameter of 75 mm and mesh sizes of 850 μm, 600 μm, 300 μm, and 150 μm (made by Iida Seisakusho K.K.). The weights of the portions of resin consequently divided were determined to find wt. % of each particle size. The classification was effected by shaking the samples for five minutes with the sieves made by Iida Seisakusho Ltd. and sold under the trademark designation of Sieve Shaker ES-65. The water absorbent resin was dried at 60±5° C. under a reduced pressure (less than 1 mmHg (133.3 pa)) for 24 hours before it was used in the determination.

(2) Determination of Solid Content

In a cup of aluminum measuring 4 cm in bottom diameter and 2 cm in height, a 1 g sample of a given water absorbent resin was uniformly spread on the bottom surface of the aluminum cup. The sample in the cup was left standing in a hot air drier adjusted in advance to 180° C. for three hours. The solid content (%) of the water absorbent resin was calculated based on the loss of weight which occurred during the standing.

(3) Free Swelling Capacity (GV)

A 0.2 g sample of a given water absorbent resin was uniformly placed in a pouch of non-woven fabric (size: 60 mm×60 mm; made by Nangoku Pulp Kogyo K.K. and sold under the trademark of "Heatlon Paper, Model GSP-22). The pouch with the sample was immersed in a large excess of an aqueous 0.9 wt. % sodium chloride solution (physiological saline) at room temperature (25±2° C.). After 30 minutes' standing in the solution, the pouch was pulled up and drained at a centrifugal force of 250 G for three minutes by the use of a centrifugal separator. Then, the weight $W_1$ (g) of the pouch was determined. The same procedure was repeated without using any water absorbent resin and the weight $W_2$ (g) of the pouch used at that time was determined. The free swelling capacity (GV) (g/g) of the sample was calculated in accordance with the following formula using $W_1$ and $W_2$.

Free swelling capacity (g/g)=[$W_1$ (g)–$W_2$ (g)–Weight (g) of water absorbent resin (g)]/Weight of water absorbent resin (g)

(4) Absorbency Against Pressure (AAP)

A 400-mesh wire gauze of stainless steel (38 μm in mesh size) was welded to the bottom of a plastic supporting cylinder 60 mm in inside diameter. Under the conditions of room temperature (25±2° C.) and 50 RH % of humidity, 0.900 g of a given water absorbent resin was uniformly scattered on the wire gauze and a piston and a load each adjusted to exert a load of 4.83 kPa uniformly on the water absorbent resin, given an outside diameter slightly smaller than 60 mm, prevented from producing a gap relative to the inner wall surface of the supporting cylinder, and enabled to produce an unobstructed vertical motion were mounted thereon sequentially in the order mentioned, and the whole weight Wa (g) of the resultant measuring device was determined.

A glass filter 90 mm in diameter (pore diameters: 100-120 μm: made by Sogo Rikagaku Glass Manufactory K.K.) was placed inside a petri dish 150 mm in diameter and an aqueous 0.9 wt. % sodium chloride solution (physiological saline) (20-25° C.) was added to the petri dish till it rose to the same level as the upper surface of the glass filter. One filter paper 90 mm in diameter (0.26 mm in thickness and 5 μm in retained particle diameter; made by Advantec Toyo K.K. and sold under the product name of "JIS P 3801, No. 2") was mounted on the physiological saline so as to have the surface thereof thoroughly wetted and the excess solution was removed.

The resultant measuring device was wholly mounted on the wetted filter paper and the water absorbent resin was allowed to absorb the solution under the load for a prescribed time. This absorption time was set at one hour as reckoned from the start of the measurement. To be specific, the whole measuring device was lifted after the one hour's standing and the weight thereof. $W_b$ (g) was determined. This determination of the weight must be performed as quickly as possible without exposing the device to any vibration. The absorbency against pressure (AAP) (g/g) was calculated in accordance with the following formula using $W_a$ and $W_b$.

AAP (g/g)=[$W_b$ (g)–$W_a$ (g)]/Weight of water absorbent resin (g)

(5) Saline Flow Conductivity (SFC)

The saline flow conductivity (SFC) is expressed by the value which indicates the degree of permeability exhibited by the particles of a given water absorbent resin in a wetted state to a relevant liquid. The SFC is an index which grows in proportion as the permeability to the liquid increases.

The determination of SFC was performed by following the test for the saline flow conductivity (SFC) described in the official gazette of International Unexamined Patent Publication HEI 9-509591 with necessary surface-treatment.

By the use of a device illustrated in FIG. 1, particles of a given water absorbent resin (0.900 g) were uniformly placed in a container 40 and left swelling in artificial urine under a pressure of 0.3 psi (2.07 kPa) for 60 minutes and the height of a layer of gel 44 was recorded. Subsequently, under a pressure of 0.3 psi (2.07 kPa), 0.69 wt. % saline 33 from a tank 31 was passed under a stated hydrostatic pressure through a swelled gel layer. This test for SFC was carried out at room temperature (20-25° C.). By means of a computer and a balance, the amounts of liquid passing the gel layer at intervals of 20 seconds were recorded as a function of time for 10 minutes. The speed of flow Fs (T) through the swelled gel 44 (mainly between adjacent particles) was decided in units of g/s by dividing the increased weight (g) by the increased time (s). The time in which the fixed hydrostatic pressure and the stable speed of flow were attained was denoted by Ts. The data obtained during the 10 minutes after Ts were exclusively used for the calculation of the speed of flow. The value of Fs (T=0), namely the initial speed of flow through the gel layer, was calculated by using the speed of flow obtained during the 10 minutes after Ts. The Fs (T 0) was calculated by extrapolating the result of the least-squares method performed on the Fs (T) against time into T=0.

Saline flow conductivity (SFC)=($Fs(t=0) \times L0$)/($\rho \times A \times \Delta P$)

=($Fs(t=0) \times L0$)/139506 wherein Fs (t 0) denotes the speed of flow expressed in units of g/s, L0 denotes the height of the gel layer expressed in units of cm, ρ denotes the density of the NaCl solution (1.003 g/cm$^3$), A denotes the upper side area of the gel layer in the cell 41 (28.27 cm$^2$), ΔP denotes the hydrostatic pressure exerted on the gel layer (4920 dynes/cm$^2$, and the unit of the value of SFC is ($10^{-7}$ cm$^3 \cdot$s$\cdot$g$^{-1}$).

In the device illustrated in FIG. 1, a tank 31 had a glass tube 32 inserted therein and the lower terminal of the glass tube 32 was so disposed that an aqueous 0.69 wt. % saline 33 could be maintained to a height of 5 cm from the bottom of the swelled gel 44 held in a cell 41. The aqueous 0.69 wt. % saline solution in the tank 31 was supplied to the cell 41 via an L-letter tube 34 fitted with a cock. Below the cell 41, a container 48 for collecting the passed liquid and this collecting container 48 was disposed on a pan scale. The cell 41 had an inside diameter of 6 cm. A wire gauze (38 μm in mesh size) 42 of stainless steel was disposed on the bottom surface in the lower part of the cell. A piston 46 was provided in the lower part thereof with holes 47 sufficient for passing a liquid and fitted in the bottom part thereof with a glass filter 45 having good permeability capable of preventing the particles of the water absorbent resin or the swelled gel thereof from entering the hole 47. The cell 41 was laid on a stand for mounting the cell. The surface of the stand contacting the cell was placed on a wire gauze 43 of stainless steel incapable of obstructing the passage of liquid.

The artificial urine mentioned above resulted from adding 0.25 g of dihydrate of calcium chloride, 2.0 g of potassium chloride, 0.50 g of hexahydrate of magnesium chloride, 2.0 g of sodium sulfate, 0.85 g of ammonium dihydrogen phosphate, 0.15 g of diammonium hydrogen phosphate, and 994.25 g of purified water together.

(6) Extractable Polymer

In a lidded plastic container (measuring 6 cm in diameter×9 cm in height) having an inner volume of 250 ml, 184.3 g of an aqueous 0.900 wt % sodium chloride solution separately weighed out was placed, 1.00 g of a granular water absorbent resin was added thereto, and they were stirred together by the use of a magnetic stirrer measuring 8 mm in diameter and 25 mm in length at a rotational frequency of 500 rpm for 16 hours to extract the soluble content in the resin. The extracted solution was passed through one filter paper (0.26 mm in thickness and 5 μm in retained particle diameter; made by Advantec Toyo K.K. and sold under the product name of "JIS P 3801 No. 2") and 50.0 g of the resultant filtrate was used for the determination.

First, an aqueous 0.900 wt % sodium chloride solution alone was titrated with an aqueous 0.1N NaOH solution till pH 10 and subsequently titrated with an aqueous 0.1N HCl solution till pH 2.7 to obtain a constant titer ([bNaOH] ml, [bHCl] ml).

By performing the same titrating operation on the solution under test, the titer ([NaOH] ml, [HCl] ml) was obtained.

In the case of the water absorbent resin which is composed of known amounts of acrylic acid and sodium salt thereof, for example, the extractable polymer of this water absorbent resin can be calculated in accordance with the following formula based on the titer which is obtained from the average molecular weight of the monomer and the aforementioned operation. When the amounts were unknown, the average molecular weight of the monomer was calculated by using the neutralization ratio found by titration.

Extractable polymer (wt %)=0.1×(average molecular weight)×184.3×100×([HCl]−[bHCl])/1000/1.0/50.0

Neutralization ratio (mol %) [1−([NaOH]−[b(NaOH)])/([HCl]−[bHCl])]×100

Production Example 1

In a kneader provided with two sigma-type blades, an acrylic acid salt type aqueous solution formed of sodium acrylate, acrylic acid, and water (monomer concentration: 38 wt. %, neutralization ratio: 75 mol %) was prepared and polyethylene glycol diacrylate (number of average ethylene oxide units, n=8) as an internal crosslinking agent was dissolved therein in a ratio of 0.065 mol % based on the monomer.

Then, nitrogen gas was blown into this aqueous solution to lower the oxygen concentration in the aqueous solution and displace the whole interior of the reaction vessel. Subsequently, with the two sigma type blades kept rotated, 0.05 mol % (based on the monomer) of sodium persulfate as a polymerization initiator and 0.0006 mol % (based on the monomer) of L-ascorbic acid were added to the vessel and the components in the kneader were stirred and polymerized for 40 minutes. Consequently, a hydrogel-like polymer having an average particle size of 2 mm was obtained.

The hydrogel-like polymer thus obtained was dried in a hot air drier set at 170° C. for 45 minutes. Then, the dried polymer was pulverized in a roll mill powdering machine and classified with a sieve having a mesh size of 850 μm to remove particles having particle diameters larger than 850 μm and obtain a powdery water absorbent resin (A) as a base polymer.

The water absorbent resin (A) consequently obtained as the base polymer was rated for various properties. The results are shown in Table 1.

The particle size distribution of the water absorbent resin (A) obtained as the base polymer is shown in Table 2.

Example 1

In a separable flask made of quartz, 10 g of the water absorbent resin (A) as the base polymer was placed and kept stirred with stirring vanes and a treating liquid prepared in advance by mixing 0.02 g of polyethylene glycol diacrylate (number of average ethylene oxide units, n=8), 0.20 g of sodium acrylate, 0.08 g of acrylic acid, 0.90 g of water, and 0.20 g of ammonium persulfate was added. After the stirring was continued for 10 minutes, the stirred mixture consequently obtained was irradiated with the ultraviolet rays emitted from an ultraviolet rays radiating device (made by Ushio Denki K.K. and sold under the product code of UV-152/1MNSC3-AA06) furnished with a metal halide lamp (made by Ushio Denki K.K. and sold under the product code of UVL-1500M2-N1) at a radiation intensity of 60 mW/cm² at a room temperature for 10 minutes, to obtain a surface-treated water absorbent resin (1). During the irradiation, the temperature in the system was adjusted in the range of 70-80° C. with radiant heat. The conditions of the surface-treatment and the absorption properties are shown in Table 3.

Example 2

A surface-treated water absorbent resin (2) was obtained by following the procedure of Example 1 while using ammonium persulfate in an amount of 0.30 g.

Example 3

A surface-treated water absorbent resin (3) was obtained by following the procedure of Example 1 while using ammonium persulfate in an amount of 0.40 g.

Example 4

A surface-treated water absorbent resin (4) was obtained by following the procedure of Example 1 while using ammonium persulfate in an amount of 0.50 g.

Example 5

A surface-treated water absorbent resin (5) was obtained by following the procedure of Example 4 while lowering the temperature in the system to about 42° C. by water cooling the separable flask with a jacket made of quartz in combination with cutting the radiant heat with a heat ray cutting filter for metal halide lamp (made by Ushio Denki).

Example 6

A surface-treated water absorbent resin (6) was obtained by following the procedure of Example 3 while adding a mixed liquid composed of 0.1 g of an aqueous 50 wt. % aluminum sulfate 14-18 hydrate solution, 0.0025 g of propylene glycol, and 0.0167 g of an aqueous 60 wt. % sodium lactate solution to the water absorbent resin (A) prior to the addition of the treating liquid.

Example 7

A surface-treated water absorbent resin (7) was obtained by following the procedure of Example 3 while adding polyethylene glycol monomethyl ether (number average molecular weight: about 2,000) in an amount of 0.05 g to the treating liquid.

Example 8

A surface-treated water absorbent resin (8) was obtained by following the procedure of Example 1 while changing the amount of ammonium persulfate to be added to 0.1 g.

Example 9

A surface-treated water absorbent resin (9) was obtained by following the procedure of Example 8 while adding 0.25 g of sodium hydrogen sulfate to the treating liquid.

Example 10

A surface-treated water absorbent resin (10) was obtained by following the procedure of Example 8 while adding 0.25 g of ammonium hydrogen sulfate to the treating liquid.

Example 11

A surface-treated water absorbent resin (11) was obtained by following the procedure of Example 8 while adding 0.25 g of ammonium sulfate to the treating liquid.

Comparative Example 1

A surface-treated water absorbent resin for comparison (1) was obtained by following the procedure of Example 5 while effecting heating with a warm bath at 80° C. for 10 minutes instead of the irradiation with ultraviolet rays.

Comparative Example 2

A surface-treated water absorbent resin for comparison (2) was obtained by following the procedure of Example 1 while using 0.00045 g of sodium persulfate and 0.003 g of Irgacure 2959 (produced by Ciba Specialty Chemicals K.K.).

Comparative Example 3

A surface-treated water absorbent resin for comparison (3) was obtained by following the procedure of Example 1 while using a treating liquid prepared in advance by mixing 0.90 g of water and 0.50 g of ammonium persulfate.

Comparative Example 4

A surface-treated water absorbent resin for comparison (4) was obtained by following the procedure of Comparative Example 3 while effecting heating with a warm bath at 80° C. for 10 minutes instead of the irradiation with an ultraviolet light.

Production Example 2

A hydrogel-like polymer was obtained by the polymerization in the same manner as in the procedure of Production Example 1 while changing the amount of the internal crosslinking agent to 0.09 mol % based on the monomer. The hydrogel-like polymer consequently obtained was dried in a hot air drier set at 175° C. for 50 minutes. Then, the dried polymer was pulverized with a roll mill powdering machine and classified through a sieve having a mesh size of 600 μm to remove particles having particle diameters larger than 600 μm and obtain a powdery water absorbent resin (B) as a base polymer.

The powdery water absorbent resin (B) obtained as the base polymer was rated for various properties. The results are shown in Table 1.

The particle size distribution of the powdery water absorbent resin (B) obtained as the base polymer is shown in Table 2.

Example 12

A surface-treated powdery water absorbent resin was obtained by following the procedure of Example 1 while using the water absorbent resin (B) instead of water absorbent resin (A) and using 0.2 g of sodium persulfate instead of ammonium persulfate. A powdered water absorbent resin (12) was obtained by allowing the resultant water absorbent resin to stand in a reduced pressure drier adjusted in advance to 60° C. under a reduced pressure for 12 hours. The powdery water absorbent resin (12) thus obtained was found to have a solid content (defined by the loss of weight by drying at 180° C. for three hours) of 93.1 wt %.

Example 13

A surface-treated powdery water absorbent resin (13) was obtained by following the procedure of Example 1 while using sodium persulfate instead of ammonium persulfate to prepare a treating liquid, and mixing the resultant treating liquid with the water absorbent resin (B) and subsequently adding 0.2 g of an aqueous 50 wt. % aluminum sulfate solution thereto. The powdery water absorbent resin (13) thus obtained was found to have a solid content (defined by the loss of weight by drying at 180° C. for three hours) of 93.3 wt %.

Example 14

A surface-treated powdery water absorbent resin (14) was obtained by following the procedure of Example 1 while using sodium persulfate instead of ammonium persulfate to prepare a treating liquid, and mixing the resultant treating liquid with the water absorbent resin (8) and subsequently adding thereto 0.2 g of a solution resulting from mixing an aqueous 50 wt. % aluminum sulfate solution and an aqueous 50 wt. % sodium lactate solution at a ratio of 5:1 in this order. The powdery water absorbent resin (14) thus obtained was found to have a solid content (defined by the loss of weight by drying at 180° C. for three hours) of 93.7 wt %.

Production Example 3

A hydrogel-like polymer was obtained by the polymerization in the same manner as in the procedure of Production Example 1 while changing the neutralization ratio of the aqueous acrylic acid salt type monomer solution to 60 mol % and the amount of the internal crosslinking agent to 0.06 mol % based on the monomer. A powdery water absorbent resin (C) was obtained as the base polymer by drying the produced hydrogel-like polymer in a hot air drier set at 175° C. for 50 minutes, pulverizing the dried polymer with a roll mill powdering machine, and classifying the resultant powder through a sieve having a mesh size of 600 μm thereby removing particles having diameters larger than 600 μm.

The powdery water absorbent resin (C) obtained as the base polymer was rated for various properties. The results are shown in Table 1.

The powdery water absorbent resin (C) obtained as the base polymer was found to have the same particle size distribution as the resin (B).

Example 15

A surface-treated water absorbent resin (15) was obtained by following the procedure of Example 4 while using 10 g of the water absorbent resin (C) as the base polymer.

Example 16

A surface-treated water absorbent resin (16) was obtained by following the procedure of Example 15 while changing the amount of ammonium persulfate to be added to 0.05 g.

Production Example 4

In a kneader provided with two sigma-type blades, an aqueous acrylic acid solution (monomer concentration: 30 wt. %) was prepared and methylene bisacrylamide as an internal crosslinking agent was dissolved therein in a ratio of 0.15 mol % based on the monomer.

Then, nitrogen gas was blown into this aqueous solution to lower the oxygen concentration in the aqueous solution and exchange the atmosphere of the whole interior of the reaction vessel. Subsequently, with the two sigma type blades being rotated, 0.016 mol % (based on the monomer) of 2,2'-azobis(2-amidinopropane)-dihydrochloride as a polymerization initiator and 0.002 mol % (based on the monomer) of L-ascorbic acid and 0.04 mol % (based on the monomer) of hydrogen peroxide were added to the vessel. When the viscosity of the aqueous acrylic acid solution increased, the rotation of the blades was stopped, and the stationary polymerization was carried out in the kneader. After the temperature of the produced gel reached the peak, the temperature of the jacket of the kneader was set at 70° C. and the gel was left standing for one hour. Subsequently, the blades of the kneader were re-rotated to pulverize the gel for 20 minutes. Then, an aqueous 20 wt. % sodium carbonate solution (equivalent to 60 mol %, based on the monomer) was added while the blades were kept rotating and mixing was continued for 60 minutes. Consequently, a hydrogel-like polymer having an average particle size of 2 mm was obtained.

The hydrogel-like polymer thus obtained was dried in a hot air drier set at 175° C. for 50 minutes. Then, the dried polymer was pulverized in a roll mill powdering machine and classified with a sieve having a mesh size of 600 μm to remove particles having particle diameters larger than 600 μm and obtain a powdery water absorbent resin (D) as a base polymer.

The water absorbent resin (D) consequently obtained as the base polymer was rated for various properties. The results are shown in Table 1.

The particle size distribution of the powdery water absorbent resin (D) obtained as the base polymer is as the same as that of the powdery water absorbent resin (B).

Example 17

A surface-treated water absorbent resin (17) was obtained by following the procedure of Example 16 while using 10 g of the water absorbent resin (D) as the base polymer.

Example 18

A surface-treated water absorbent resin (18) was obtained by following the procedure of Example 1 except that in the treating liquid in Example 1, the amount of ammonium persulfate was changed to 0.05 g and 0.2 g of 3-methacryloyloxy propyltrimethoxy silane (produced by TORAY•Dow Corning Company under the product name: SZ6030) is added thereto.

The surface-treated water absorbent resins obtained as described above were rated for various properties. The results of the rating are shown in Tables 1-4.

TABLE 1

|  | GV (g/g) | Extractable polymer (%) | Solid content (%) |
|---|---|---|---|
| Base polymer (A) | 34.5 | 12.4 | 92.3 |
| Base polymer (B) | 32.8 | 7.9 | 93.3 |
| Base polymer (C) | 36.7 | 14.7 | 95.4 |
| Base polymer (D) | 35.0 | 2.3 | 94.8 |

TABLE 2

| Particle size | Production Example 1 base polymer (A) | Production Example 2 base polymer (B) |
|---|---|---|
| 850 μm< | 0.0% | 0.0% |
| 600-850 μm | 28.0% | 0.0% |
| 300-600 μm | 54.8% | 67.3% |
| 300-150 μm | 15.0% | 30.5% |
| 150 μm> | 2.2% | 2.2% |

TABLE 3

| | Base polymer | Water-soluble radical polymerization initiator | Initiator (wt. %) | Monomer (wt. %) | UV or heating | Other additive (wt. %) | Internal Temp. in system (° C.) | GV (g/g) | AAP (g/g) | SFC ($10^{-7} \cdot cm^3 \cdot s \cdot g^{-1}$) |
|---|---|---|---|---|---|---|---|---|---|---|
| Prod. Ex. 1 | BP* (A) | — | — | — | — | — | — | 34.5 | 7.5 | 0 |
| Ex. 1 | WAR* (1) | (A) | Ammonium persulfate | 2 | 3 | UV 10 min. | — | 71 | 25.0 | 21.2 | 88 |
| Ex. 2 | WAR (2) | (A) | Ammonium persulfate | 3 | 3 | UV 10 min. | — | 71 | 23.4 | 21.7 | 120 |
| Ex. 3 | WAR (3) | (A) | Ammonium persulfate | 4 | 3 | UV 10 min. | — | 71 | 22.6 | 20.7 | 135 |
| Ex. 4 | WAR (4) | (A) | Ammonium persulfate | 5 | 3 | UV 10 min. | — | 72 | 22.8 | 19.6 | 112 |
| Ex. 5 | WAR (5) | (A) | Ammonium persulfate | 5 | 3 | UV 10 min. | — | 42 | 23.5 | 20.1 | 83 |

TABLE 3-continued

|  |  | Base polymer | Water-soluble radical polymerization initiator | Initiator (wt. %) | Monomer (wt. %) | UV or heating | Other additive (wt. %) | Temp. in system (°C.) | GV (g/g) | AAP (g/g) | SFC ($10^{-7} \cdot cm^3 \cdot s \cdot g^{-1}$) |
|---|---|---|---|---|---|---|---|---|---|---|---|
| Ex. 6 | WAR (6) | (A) | Ammonium persulfate | 4 | 3 | UV 10 min. | A1*): 1.192 | — | 21.9 | 19.7 | 132 |
| Ex. 7 | WAR (7) | (A) | Ammonium persulfate | 4 | 3 | UV 10 min. | Polyethylene glycol monomethyl ether: 0.5 | — | 23.4 | 20.6 | 109 |
| Ex. 8 | WAR (8) | (A) | Ammonium persulfate | 1 | 3 | UV 10 min. | — | — | 27.4 | 21.1 | 41 |
| Ex. 9 | WAR (9) | (A) | Ammonium persulfate | 1 | 3 | UV 10 min. | Sodium hydrogen persulfate: 2.5 | — | 24.7 | 20.7 | 96 |
| Ex. 10 | WAR (10) | (A) | Ammonium persulfate | 1 | 3 | UV 10 min. | Ammonium hydrogen persulfate: 2.5 | — | 24.4 | 20.8 | 90 |
| Ex. 11 | WAR (11) | (A) | Ammonium persulfate | 1 | 3 | UV 10 min. | Ammonium sulfate: 2.5 | — | 24.9 | 21.5 | 98 |
| Comp. Ex. 1 | WAR (1) for comparison | (A) | Ammonium persulfate | 5 | 3 | Htg*** at 80° C. for 10 min. | — | 80 | 27.9 | 13.4 | 9 |
| Comp. Ex. 2 | WAR (2) for comparison | (A) | Sodium persulfate | 0.0045 | 3 | UV 10 min. | Irugacure: 2959(0.03) | 72 | 25.6 | 20.9 | 38 |
| Comp. Ex. 3 | WAR (3) for comparison | (A) | Ammonium persulfate | 5 | 0 | UV 10 min. | — | 74 | 24.5 | 19.2 | 61 |
| Comp. Ex. 4 | WAR (4) for comparison | (A) | Ammonium persulfate | 5 | 0 | Htg*** at 80° C. for 10 min. | — | 80 | 31.4 | 8.0 | 0 |

*BP: Base polymer WAR: Water absorbent resin
*)Aqueous 50 wt. % aluminum sulfate 14-18 hydrate solution/propylene glycol/aqueous 60 wt. % sodium lactate solution = 1.0/0.025/0.167 wt. % (based on the base polymer)

TABLE 4

|  |  | Base polymer | Water-soluble radical polymerization initiator | Initiator (wt. %) | Monomer (wt. %) | UV or heating | Other additive (wt. %) | Temp. in system (°C.) | GV (g/g) | AAP (g/g) | SFC ($10^{-7} \cdot cm^3 \cdot s \cdot g^{-1}$) |
|---|---|---|---|---|---|---|---|---|---|---|---|
| Prod. Ex. 2 | BP* (B) | — | — | — | — | — | — | — | 32.8 | 7.2 | 0 |
| Example 12 | WAR* (12) | (B) | Sodium persulfate | 2 | 3 | UV 10 min. | — | 73 | 25.8 | 23.5 | 75 |
| Example 13 | WAR (13) | (B) | Sodium persulfate | 2 | 3 | UV 10 min. | A1**): 2 | 71 | 24.4 | 21.6 | 131 |
| Example 14 | WAR (14) | (B) | Sodium persulfate | 2 | 3 | UV 10 min. | A1***): 2 | 71 | 25.5 | 22.5 | 87 |
| Prod. Ex. 3 | BP (C) | — | — | — | — | — | — | — | 36.7 | 6.6 | 0 |
| Example 15 | WAR (15) | (C) | Ammonium persulfate | 5 | 3 | UV 10 min. | — | — | 25.3 | 21.2 | 84 |
| Example 16 | WAR (16) | (C) | Ammonium persulfate | 0.5 | 3 | UV 10 min. | — | — | 25.2 | 21.2 | 82 |
| Prod. Ex. 4 | BP (D) | — | — | — | — | — | — | — | 35.0 | 7.9 | 0 |
| Example 17 | WAR (17) | (D) | Ammonium persulfate | 0.5 | 3 | UV 10 min. | — | — | 26.9 | 24.1 | 52 |
| Example 18 | WAR (18) | (A) | Ammonium persulfate | 0.5 | 3 | UV 10 min. | SZ6030: 2 | — | 26.7 | 22.2 | 116 |

*BP: Base polymer WAR: Water absorbent resin
**)Aqueous 50 wt. % aluminum sulfate,
***)Mixed solution of aqueous 50 wt % aluminum sulfate solution and aqueous 50% sodium lactate solution at a ratio of 5:1,
The amounts of the water-soluble radical polymerization initiator and other additives are indicated with wt. % based on the base polymer.

INDUSTRIAL APPLICABILITY

This invention promises industrial applicability satisfactorily because the surface treatment given to a water absorbent resin with the object of modifying the resin can be effected fully satisfactorily at a reaction temperature approximating normal room temperature and the modified water absorbent resin consequently obtained excels in water absorbing properties and, therefore, can be utilized for disposable diapers, for example.

The entire disclosure of Japanese Patent Application Nos. 2004-359033 filed on Dec. 10, 2004 and 2005-240214 filed on Aug. 22, 2005 including specification, claims, drawings and summary are incorporated herein by reference in its entirety.

The invention claimed is:

1. A method for the surface-treatment of a water absorbent resin, which comprises:
   a) mixing a water absorbent resin with 0.01-20 parts by weight, based on 100 parts by weight of the total amount of the water absorbent resin, of at least one radical polymerization initiator selected from the group consisting of persulfates, hydrogen peroxide, and azo compounds, and a radically polymerizing compound, in an amount in the range of 1-9 parts by weight based on 100 parts by weight of the water absorbent resin; and
   b) irradiating the resultant mixture with active energy rays.

2. A method according to claim 1, wherein said water absorbent resin is produced by using an ethylenically unsaturated monomer and an inner crosslinking agent, and said radically polymerizing compound contains a compound different from said ethylenically unsaturated monomer and said inner crosslinking agent.

3. A method according to claim 2, wherein said radically polymerizing compound contains an ethylenically unsaturated monomer having a hetero atom other than oxygen.

4. A method according to claim 3, wherein said ethylenically unsaturated monomer having a hetero atom other than oxygen is contained in an amount of not more than 50 parts by weight based on 100 parts by weight of the total amount of the radically polymerizing compound.

5. A method according to claim 1, wherein said radical polymerization initiator is a persulfate.

6. A method according to claim 1, wherein said radical polymerization initiator and said radically polymerizing compound are mixed in an aqueous solution.

7. A method according to claim 1, which further comprises mixing water in an amount in the range of 1-20 parts by weight with 100 parts by weight of the water absorbent resin during the step of mixing said water absorbent resin, said radical polymerization initiator and said radically polymerizing compound.

8. A method according to claim 1, wherein a mixing aid other than water is added at the same time as or prior to the step a).

9. A method according to claim 8, wherein said mixing aid is at least one water-soluble or water-dispersible compound selected from the group consisting of surfactants, water-soluble polymers, hydrophilic organic solvents, water-soluble inorganic compounds, inorganic acids, inorganic acid salts, organic acids, and organic acid salts.

10. A method according to claim 8, wherein said mixing aid is at least one water-soluble or water-dispersible compound selected from the group consisting of polyoxyethylene alkyl ethers, polyethylene glycol, water-soluble polyvalent metals, sodium chloride, ammonium hydrogen sulfate, ammonium sulfate, sulfuric acid, and hydrochloric acid.

11. A method according to claim 8, wherein said mixing aid is added in an amount in the range of 0.01 to 40 parts by weight based on 100 parts by weight of said water absorbent resin.

12. A method according to claim 1, wherein said water absorbent resin has an acid group and a mol % of the neutralized acid group in the whole acid group in the range of 50-75 mol %.

13. A method according to claim 1, wherein said active energy rays are ultraviolet rays.

14. A method according to claim 1, wherein the radiation of the active energy rays is carried out while heating the resultant mixture.

15. A method according to claim 1, wherein said water absorbent resin is a powdery resin obtained by polymerizing a monomer having acrylic acid or a salt thereof as a main component.

16. A method according to claim 1, wherein said water absorbent resin is obtained by producing a water absorbent resin precursor having a low neutralization ratio, and mixing said water absorbent resin precursor with a base.

17. A method according to claim 1, wherein said water absorbent resin contains particles having diameters in the range of 150-850 μm in a ratio in the range of 90-1.00 wt. %.

18. A method according to claim 1, wherein the absorbency of physiological saline against pressure of 4.83 kPa of said water absorbent resin subsequent to surface-treatment is improved not less than 1 g/g comparing with the absorbency against pressure of the resin prior to the surface-treatment.

19. A method according to claim 1, wherein 0.1 to 15 parts by weight of the radical polymerization initiator are mixed with the water absorbent resin.

20. A process for the production of a surface-crosslinked water absorbent resin, which comprises applying the method for the surface-treatment set forth in claim 1 to a water absorbent resin.

21. A process according to claim 20, wherein the absorbency of physiological saline against pressure of 4.83 kPa of the water absorbent resin subsequent to surface-crosslinking treatment is in the range of 8-40 g/g.

22. A process according to claim 20, wherein the saline flow conductivity of the water absorbent resin subsequent to surface-crosslinking treatment is not less than 10 ($10^{-7} \cdot cm^3 \cdot s \cdot g^{-1}$).

23. A water absorbent which is obtained by the method set forth in claim 2.

24. A water absorbent which is obtained by the method set forth in claim 3.

25. A water absorbent according to claim 24, wherein said ethylenically unsaturated monomer having a hetero atom other than oxygen contains an ethylenically unsaturated monomer having a silicon.

* * * * *